United States Patent
Titus et al.

Patent Number: 5,908,273
Date of Patent: Jun. 1, 1999

[54] KEY DUPLICATION APPARATUS AND METHOD

[75] Inventors: John S. Titus, Prior Lake; William Laughlin, Minnetonka, both of Minn.

[73] Assignee: Machine Magic-LLC, Minnetonka, Minn.

[21] Appl. No.: 08/903,561

[22] Filed: Jul. 31, 1997

[51] Int. Cl.$^6$ .................................................. B23C 1/16
[52] U.S. Cl. .......................... 409/81; 76/110; 250/202; 356/376; 364/474.03; 409/80; 409/83; 409/84; 409/132
[58] Field of Search ............... 409/80, 81, 82, 409/83, 84, 96, 131, 132; 76/110; 348/95; 250/202, 560, 561; 356/376, 394, 398; 364/474.03, 474.17

[56] References Cited

U.S. PATENT DOCUMENTS

| | | |
|---|---|---|
| Re. 26,848 | 4/1970 | Simon . |
| Re. 27,665 | 6/1973 | Spain . |
| 3,276,328 | 10/1966 | Schreiber et al. . |
| 3,323,420 | 6/1967 | Roxburgh . |
| 3,388,619 | 6/1968 | Schreiber et al. . |
| 3,430,535 | 3/1969 | Haggstrom . |
| 3,442,174 | 5/1969 | Weiner et al. . |
| 3,457,831 | 7/1969 | Adler et al. . |
| 3,466,747 | 9/1969 | Patriquin et al. . |
| 3,496,636 | 2/1970 | Lieptz . |
| 3,499,366 | 3/1970 | Spain . |
| 3,602,092 | 8/1971 | Richens . |
| 3,633,451 | 1/1972 | Lieptz . |
| 3,656,402 | 4/1972 | French . |
| 3,675,536 | 7/1972 | Hungerford, Jr. et al. . |
| 3,682,041 | 8/1972 | Essig .......................... 409/83 |
| 3,722,341 | 3/1973 | Hungerford, Jr. et al. . |
| 3,769,865 | 11/1973 | Kleist . |
| 3,795,174 | 3/1974 | Oliver et al. . |
| 3,796,130 | 3/1974 | Gartner . |
| 3,807,276 | 4/1974 | Oliver . |
| 3,865,011 | 2/1975 | Patriquin . |
| 3,884,121 | 5/1975 | Agius . |
| 3,919,920 | 11/1975 | Schlage . |
| 3,945,298 | 3/1976 | Cockroft . |
| 3,956,968 | 5/1976 | Crasnianski . |
| 3,981,214 | 9/1976 | Wich . |
| 4,012,991 | 3/1977 | Uyeda . |
| 4,019,415 | 4/1977 | Wich . |
| 4,023,464 | 5/1977 | Zion . |
| 4,051,748 | 10/1977 | Sherman . |
| 4,062,261 | 12/1977 | Stahl . |
| 4,088,060 | 5/1978 | Johns . |
| 4,090,303 | 5/1978 | Uyeda . |
| 4,092,806 | 6/1978 | Wich . |
| 4,117,763 | 10/1978 | Uyeda . |
| 4,132,151 | 1/1979 | Weber . |
| 4,143,582 | 3/1979 | Heimann . |
| 4,188,163 | 2/1980 | Juskevic . |
| 4,251,173 | 2/1981 | Saucedo . |
| 4,256,423 | 3/1981 | Juskevic . |
| 4,300,170 | 11/1981 | Sakamoto .......................... 358/293 |
| 4,300,836 | 11/1981 | Holmes et al. .................... 356/376 |
| 4,354,780 | 10/1982 | Bougiouris . |
| 4,373,414 | 2/1983 | Agius . |
| 4,468,994 | 9/1984 | Lieptz . |
| 4,521,142 | 6/1985 | Juskevic . |

(List continued on next page.)

FOREIGN PATENT DOCUMENTS 2489535  3/1982  France .

*Primary Examiner*—Andrea L. Pitts
*Assistant Examiner*—Christopher Kirkman
*Attorney, Agent, or Firm*—Merchant, Gould, Smith, Edell, Welter & Schmidt, P.A.

[57] ABSTRACT

In a method and apparatus for duplicating an original key, the keyway and keycode of the original key are measured and duplicated in a preform. The preform used in the duplication process need not include any keyway or keycode prior to the duplication process and, therefore, a single type of preform may be used in generating duplicates of many different types of keys. The apparatus may be automated to take the measurements of the original key and to cut the duplicate key, thus reducing the possibility of producing a nonfunctional duplicate.

39 Claims, 19 Drawing Sheets

U.S. PATENT DOCUMENTS

| | | |
|---|---|---|
| 4,525,908 | 7/1985 | Bernstein . |
| 4,526,498 | 7/1985 | Fieldhouse . |
| 4,562,759 | 1/1986 | Schmitt . |
| 4,638,567 | 1/1987 | Leversee ................................... 33/540 |
| 4,651,604 | 3/1987 | Almblad et al. . |
| 4,653,104 | 3/1987 | Tamura ....................................... 382/1 |
| 4,657,448 | 4/1987 | Alexander . |
| 4,666,351 | 5/1987 | Marchal . |
| 4,671,711 | 6/1987 | Steinbach et al. . |
| 4,687,389 | 8/1987 | Santii et al. . |
| 4,717,294 | 1/1988 | Grasser . |
| 4,741,652 | 5/1988 | Marchal . |
| 4,780,032 | 10/1988 | Uyeda et al. . |
| 4,803,371 | 2/1989 | Durland ................................. 250/560 |
| 4,898,504 | 2/1990 | Agius et al. . |
| 4,899,391 | 2/1990 | Cimino et al. . |
| 4,929,129 | 5/1990 | Dickson . |
| 4,929,843 | 5/1990 | Chmielewski, Jr. .................... 250/561 |
| 4,969,782 | 11/1990 | Castain . |
| 4,971,489 | 11/1990 | Womack . |
| 4,993,291 | 2/1991 | Sopko . |
| 4,998,349 | 3/1991 | Killeen . |
| 5,122,018 | 6/1992 | Zion . |
| 5,127,532 | 7/1992 | Cimino et al. . |
| 5,128,531 | 7/1992 | Fadel ....................................... 250/202 |
| 5,165,315 | 11/1992 | Terada . |
| 5,171,112 | 12/1992 | Roland . |
| 5,244,321 | 9/1993 | Sopko . |
| 5,255,199 | 10/1993 | Barkman et al. ................... 364/474.17 |
| 5,259,708 | 11/1993 | Brice . |
| 5,271,698 | 12/1993 | Heredia et al. . |
| 5,307,151 | 4/1994 | Hof et al. ................................. 356/376 |
| 5,314,274 | 5/1994 | Heredia et al. . |
| 5,443,339 | 8/1995 | Heredia et al. . |
| 5,496,138 | 3/1996 | Drori . |
| 5,517,299 | 5/1996 | Teratani et al. ........................... 356/71 |
| 5,538,374 | 7/1996 | Cole et al. . |
| 5,556,240 | 9/1996 | Almblad . |
| 5,583,443 | 12/1996 | McMurty et al. ....................... 324/601 |
| 5,807,042 | 9/1998 | Almblad et al. .......................... 409/81 |

KEY DUPLICATION APPARATUS AND METHOD

BACKGROUND

The present invention is directed generally to a method and apparatus for making a copy of a key.

Hundreds of millions of keys are generated in the United States each year by making a duplicate from an original key or from a parent duplicate key. The duplication process commonly takes place in a hardware store, or the like, that is equipped with a key duplication machine.

Duplicating a key is difficult task, typically requiring high skill in operating the duplicating machine. A high degree of skill is particularly required when duplicating a double sided key in order to achieve correct registration of the second side after cutting the first side. Due to the high probability of making an error when duplicating a key, a significant number of the duplicate keys made each year are discarded as being unusable.

Since there is a wide variation in the types of keys manufactured, the locksmith or hardware store where the duplicate is made has to carry a large number of different key blanks, often numbering in the thousands, in inventory from which an appropriate blank is selected for forming the duplicate key. When faced with duplicating a key of unknown origin, the person performing the duplication is presented with the difficult task of selecting the correct key blank with which to manufacture the duplicate. This may lead to the selection of the wrong key blank, thus resulting in an unusable duplicate key.

The security hierarchy adopted by many key manufacturers includes thicker keys with relatively complex keyways for use in single locks, and master keys that are thinner and have relatively simple keyways. Often, master key blanks are employed for forming duplicate keys in an attempt to reduce the number of key blanks required in inventory, irrespective of whether the key being duplicated is a master key or is cut for a single lock. Consequently, the security hierarchy is compromised when a large number of keys cut from master key blanks enter into use.

One manufacturer has adopted a system that uses a small number of key blanks in which it is claimed most keys can be duplicated, thus reducing the level of skill required of the person performing the duplication. However, this system still requires a significant inventory of different key blanks and, additionally, is subject to the problem of low-skilled operators making a large number of rejectable duplicate keys.

Therefore, there remains a need for a key duplicating system which further reduces the number of types of key blanks required to be carried in inventory. Additionally, there is a need to remove the factor of operator skill level from the duplication process so that fewer rejectable duplicate keys are manufactured.

SUMMARY OF THE INVENTION

Generally, the present invention relates to an apparatus and method for duplicating an original key by measuring the original key and using measurements thus obtained to fabricate the duplicate key. In one embodiment of the invention, the keyway of the original key is measured and formed in the duplicate key. In another embodiment of the invention, both the keycode and the keyway of the original key are measured and formed on the duplicate key.

The preform from which the duplicate key is made does not have a keyway already formed thereon, because the keyway is formed on the preform when the duplicate is manufactured. Thus, many different types of keys may be made from a single, simple preform, and the need to stock different types of keyblanks having different keyways is reduced.

The key duplication apparatus may be automated, i.e. may take measurements of the original key and may form the duplicate key automatically, without significant input from the operator. Thus, the operator's skill level may be largely removed as being a factor in whether a duplicate key is usable or rejectable.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1B:
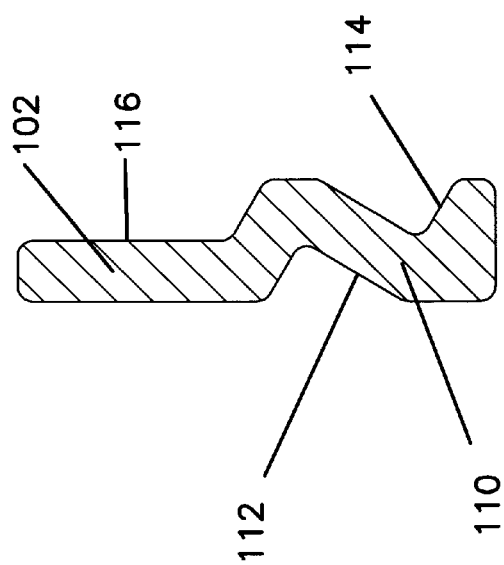
FIG. 1B is a cross-sectional view of the key taken through the section 1B—1B shown in FIG. 1A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a method and apparatus for duplicating a key that provides a significant benefit in avoiding the need for maintaining an inventory of different types of key blanks. The present invention advantageously provides for a large number of different types of keys to be cut from one type of blank preform. The preform may simply be a piece of stock metal material: no keycode or keyway need be present on the preform prior to the duplication process taking place. In a typical duplication process, the preform may be cut to the correct length, width and thickness, in addition to having the keycode and keyway formed thereon. Additionally, the number of unusable duplicates is reduced because the duplication process of the present invention obviates the need for a skilled operator. Therefore, unlike conventional key duplicators, the key duplicator of the present invention need not be located where there is an operator having a high level of skill, such as a hardware store, or a locksmith.

Figure 1A:
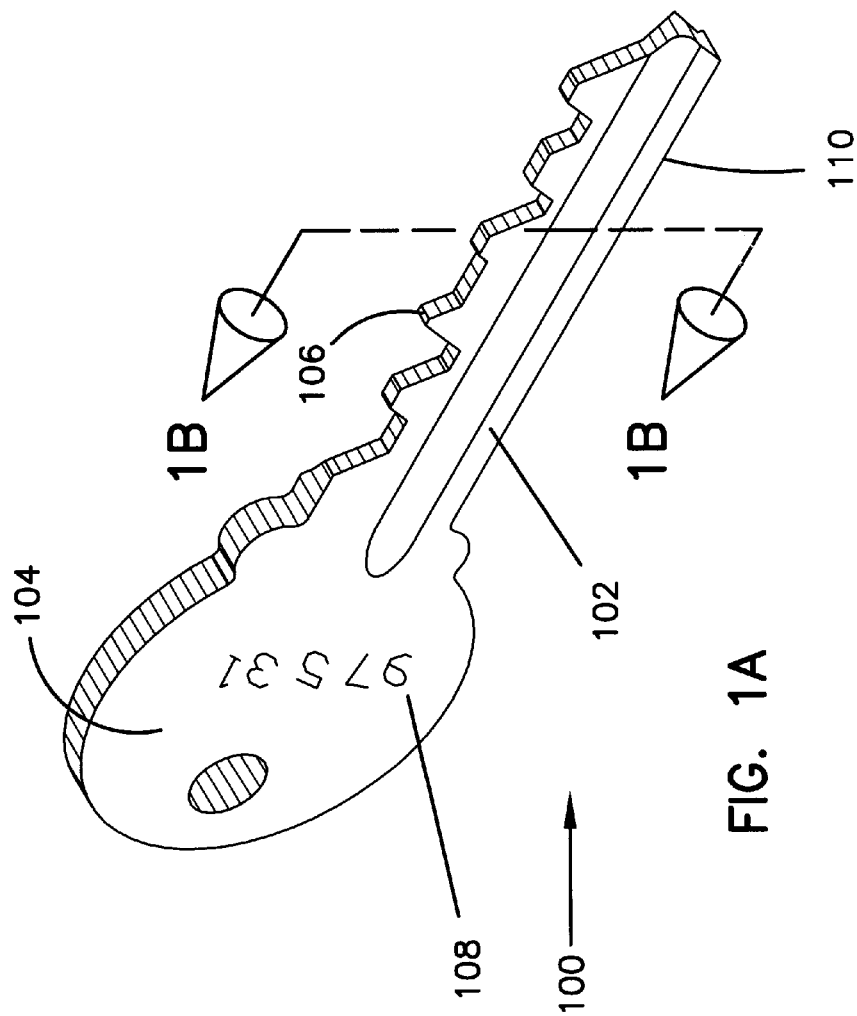
FIG. 1A is a perspective view of a key.

FIG. 1A illustrates the various component parts of a key 100. The key shaft 102 extends from the key bow 104. The key bow 104 is the portion typically held by the user when using the key. The shaft 102 has a keycode 106 along one edge. The bow 104 may be provided with a numerical code 108 that corresponds to the keycode 106.

The cross section of the shaft 102 has a particular shape, known as the keyway 110. The profile of the keyway 110 is illustrated in FIG. 1B, which shows a cross section 1B—1B through the shaft 102. The keyway 110 illustrated includes a notch 112 on a first side of the shaft 102 and another notch 114 and land 116 on the second side of the shaft 102. The notches 112 and 114 and land 116 run the length of the shaft and mate with the aperture of the lock when the key 100 is inserted.

It will be appreciated that the key shown in FIGS. 1A and 1B is only an example of a key and is not intended to limit the scope of the invention in any way. For example, the key 100 may be a double-sided key, in which case the keycode is found on opposite edges of the shaft. Generally, although not always the case, the same keycode is provided on each edge of a double-sided key so that it may be inserted into the lock in either orientation. Additionally, it will be appreciated that keys come with many different keyway profiles. Indeed, it is one of the major problems in the key industry that, due to the large number of different keyways, a large number of key blanks have to be held in inventory.

Figure 2:
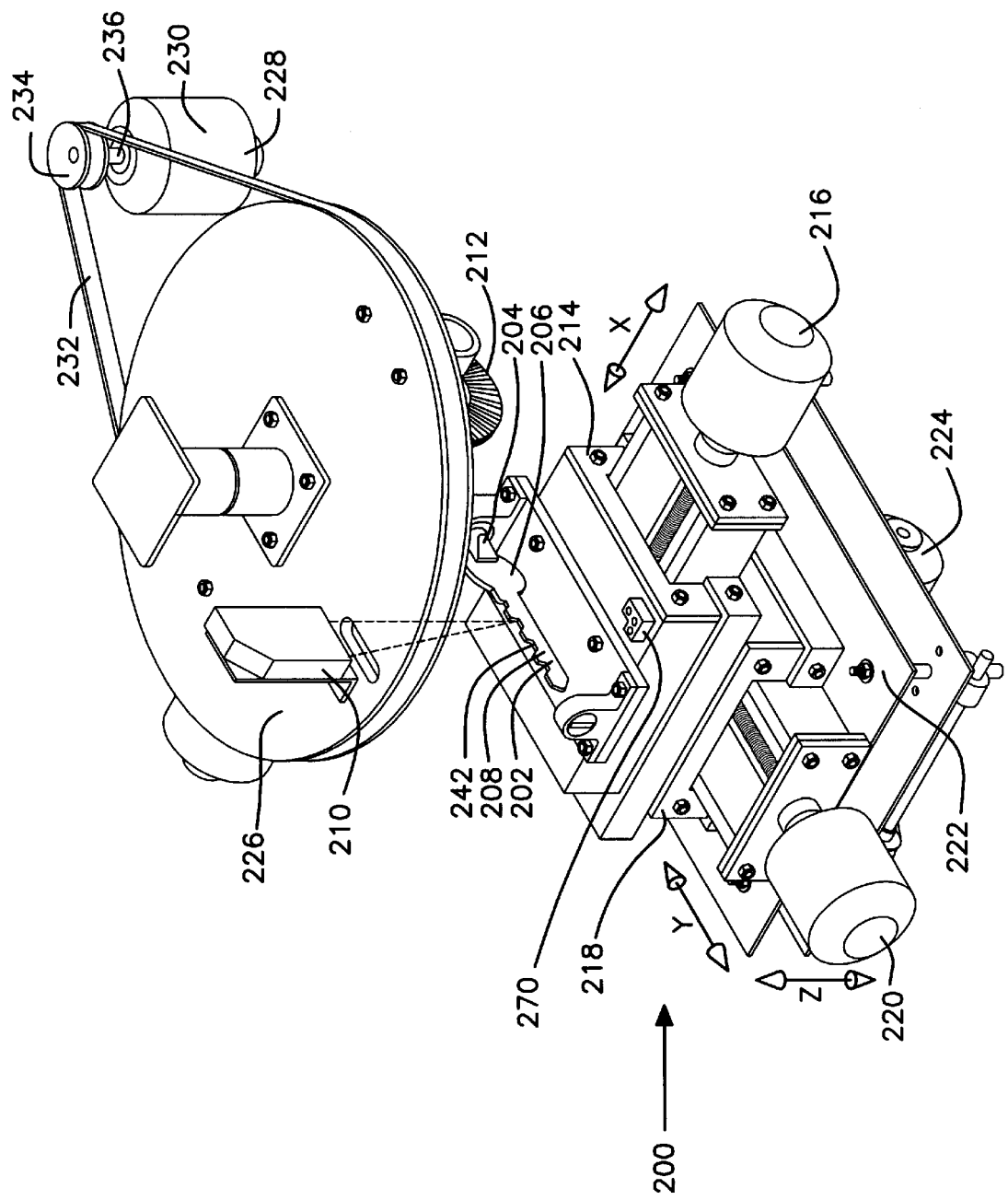
FIG. 2 is a perspective view of a key duplicating apparatus measuring a keycode of a master key in accordance with an embodiment of the present invention.
Figure 3:
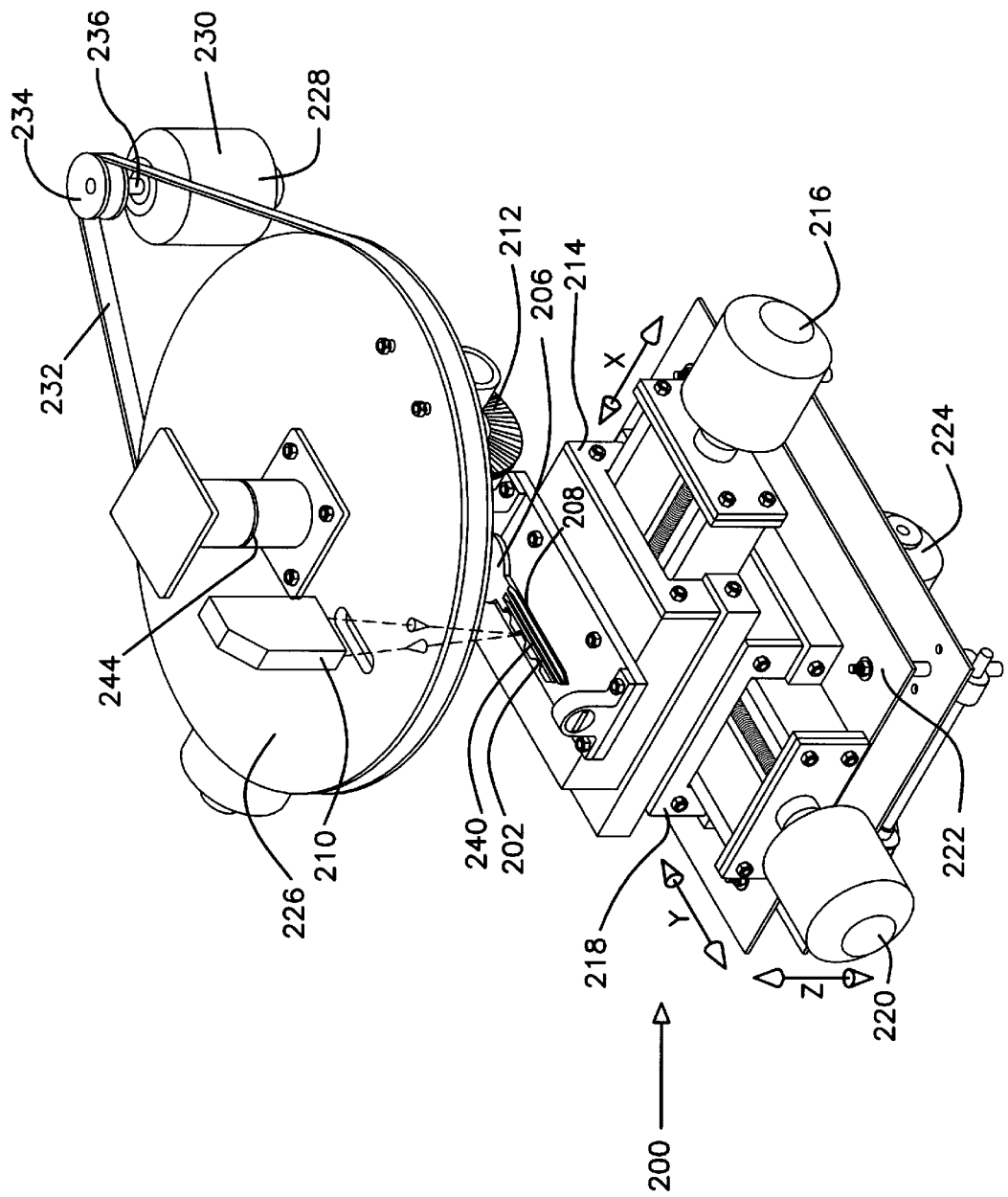
FIG. 3 is a perspective view of a key duplicating apparatus measuring a keyway of a master key.
Figure 4:
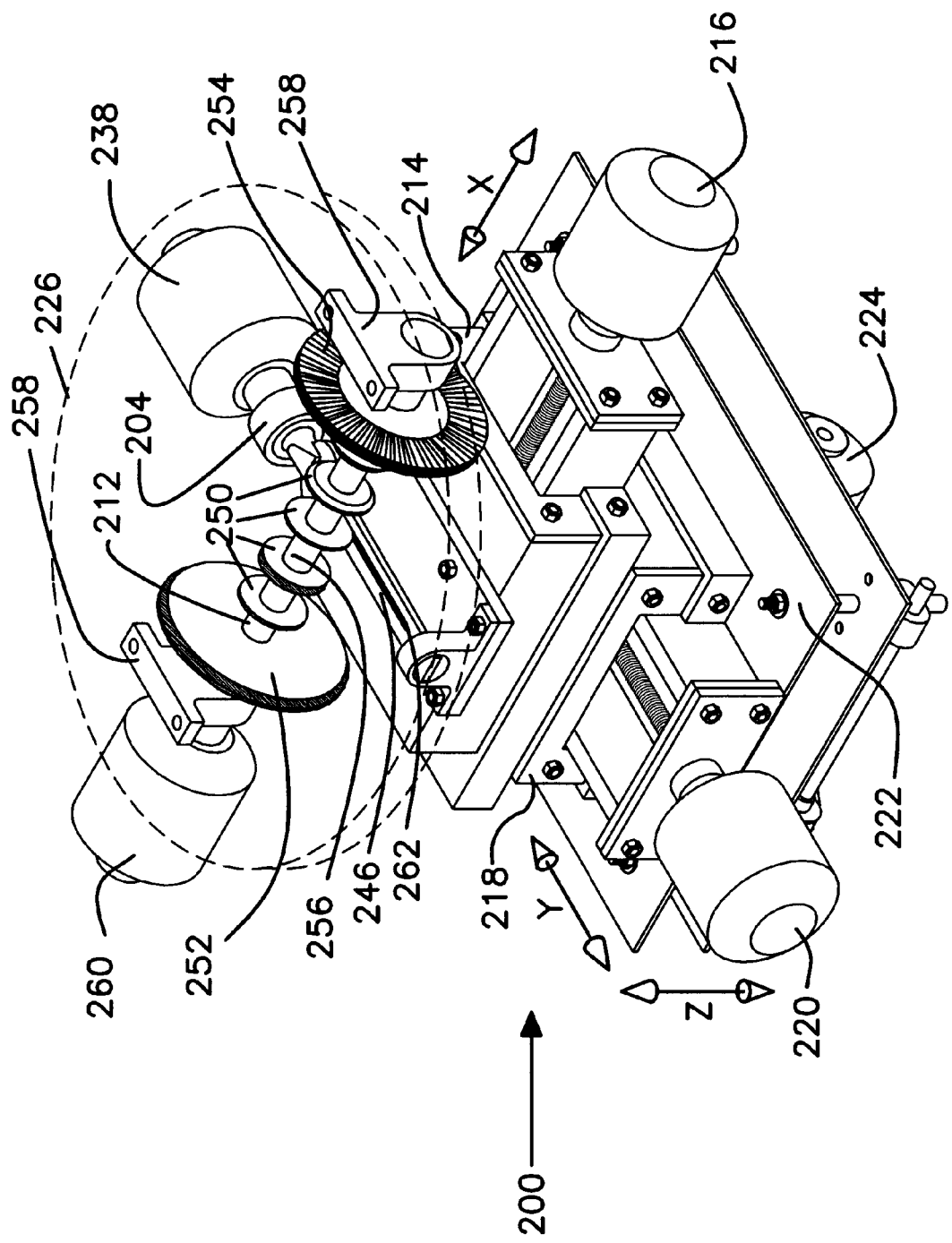
FIG. 4 is a partial perspective view of a key duplicating apparatus cutting a keyway in a blank preform.
Figure 5:
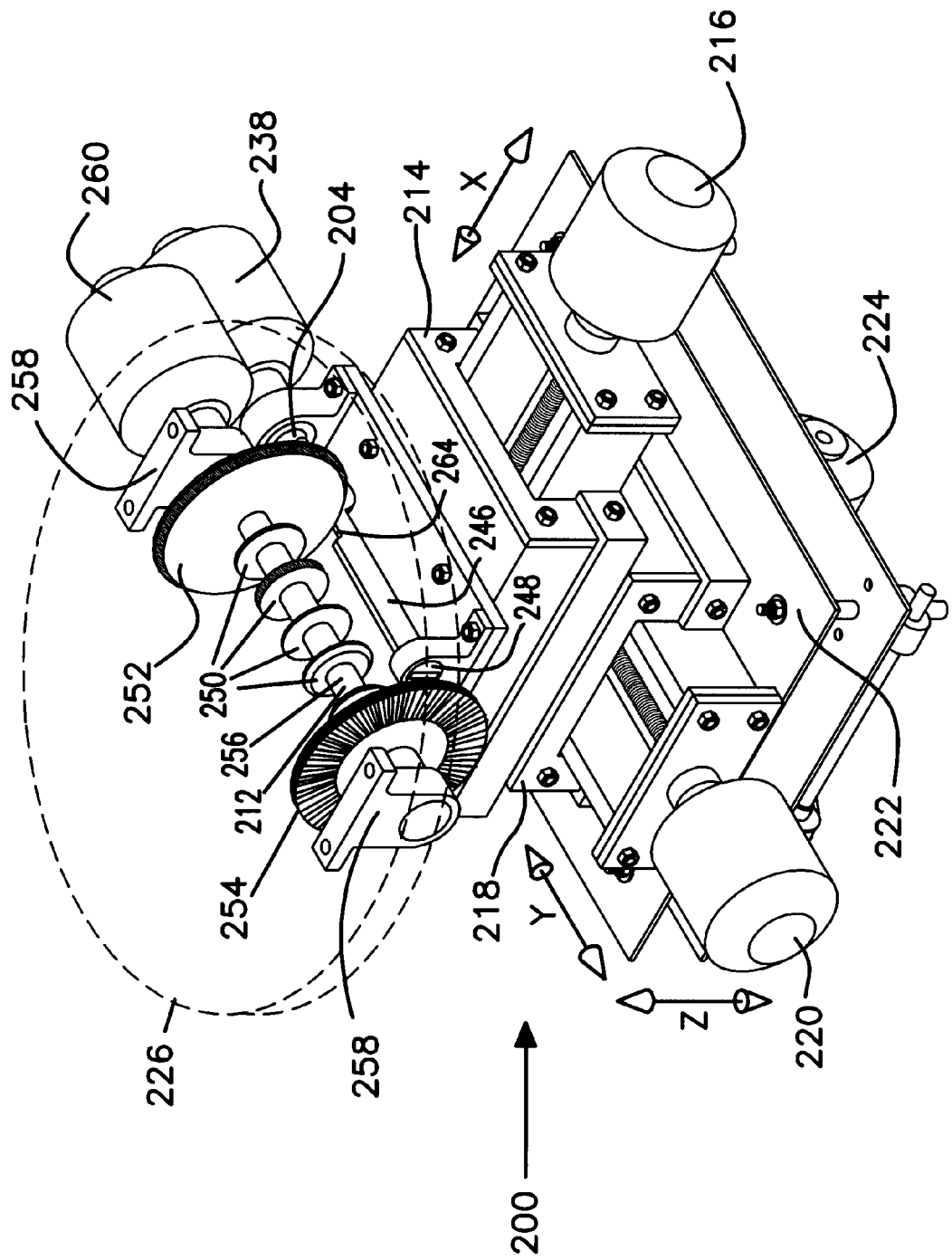
FIG. 5 is a partial perspective view of a key duplicating apparatus cutting a keycode in a blank preform.

FIGS. 2–5 illustrate one particular embodiment of a key-duplicating apparatus 200. FIGS. 2 and 3 illustrate the key-duplicating apparatus 200 in an "original-measuring" mode, in which the original key 202 to be copied is measured for its keycode 242 and keyway 240. FIGS. 4 and 5 illustrate the key-duplicating apparatus 200 in a "key-fabricating" mode, in which a duplicate key is cut from a blank preform 246. The preform 246 is held between the key holder 204 and a tip holder 248.

Referring initially to FIG. 2, a key 202 is held by a key holder 204. The key holder 204 holds the bow 206 of the key 202 so that the shank 208 is accessible by the measuring device 210 and the cutting tool 212. The key holder 204 is mounted on a translation stage 214 that travels in the x-direction. The x-translation stage is driven by a stepper motor 216. The x-translation stage 214 is mounted on top of a second translation stage 218, oriented for translation in the y-direction. The y-translation stage 218 is driven by a stepper motor 220. The y-translation stage 218 is mounted on a third translation stage 222 which provides translation in the z-direction. The z-translation stage 222 is driven by another stepper motor 224. The stepper motors 216, 220, and 224 are controlled by a controller (not illustrated) so that the key can be positioned at any point in x, y, z within the range of travel of the translation stages 214, 218 and 222.

A rotatable platform is positioned above the key holder 204 and the stack of translation stages 214, 218 and 222. The rotatable platform 226 holds the measuring device 210 and the cutting tool 212. The rotatable platform 226 is rotated using a rotator drive 228. The rotator drive 228 is used for rotating the rotatable platform 226 between two positions, namely: a) the cutting tool 212 being perpendicular to the key shank 208, and b) the cutting tool 212 being parallel to the key shank 208. Accordingly, the rotator drive 228 rotates the rotatable platform 226 between two positions, separated by 90°. The rotator drive 228 includes a stepper motor 230 and a drive belt 232 positioned around the periphery of the rotatable platform 226 and a pulley 234 mounted on the shaft 236 of the stepper motor 230.

The key holder 204 is also rotatable, and its rotating motion is controlled by a second rotary stepping motor 238, illustrated in FIGS. 4 and 5. Accordingly, the key 202 may be rotated for measuring either its keycode or its keyway. FIG. 2 illustrates the key 202 oriented with its keycode directed towards the measuring device 210 so that the key-duplicating apparatus 200 can measure the keycode 242 of the key 202.

FIG. 3 illustrates the same apparatus as FIG. 2, except that here the key 202 has been rotated through 90° into position for measurement of the keyway 249 by the measuring device 210.

The rotatable platform 226 is mounted to an apparatus frame (not illustrated) by a rotatable bushing 244.

FIG. 4 illustrates the cutting tool 212, including a number of edge cutters 250 used for cutting the keyway profile, a key-code cutter 252, and a wire brush 254 arranged on a shaft 256. The shaft 256 is supported at either end by shaft supports 258 that are attached to the underside of the rotatable platform 226 (shown in dashed lines in FIGS. 4 and 5). The shaft 256 is rotated by the cutting tool motor 260.

FIG. 4 illustrates the apparatus 200 in a "keyway cutting" mode, with one of the edge cutters 250 forming a groove along the preform 246 to make a keyway 262. The edge cutters 250 are selected so as to provide a variety of shapes of cutter profiles for cutting the keyway 262 into the blank preform 246.

FIG. 5 illustrates the same apparatus as in FIG. 4, but in a "key-code cutting" mode. Here, the blank preform 246 has been rotated through 900 from the position illustrated in FIG. 4. Additionally, the rotatable platform 226 has been rotated through 90° so that the shaft 256 is parallel with the blank preform 246. The blank preform 246 has been brought into position by the x-, y- and z-translation stages 214, 218 and 222 so as to engage the keycode cutter 252 on the edge of the blank preform 246. The blank preform is translated relative to the keycode cutter 252 by the x-, y- and z-translation stages 214, 218 and 222 as the keycode cutter 252 is rotated by the cutting tool motor 260. The keycode 264 is cut into the edge of the key according to the relative movements of the translation stages 214, 218 and 222.

Figure 18:
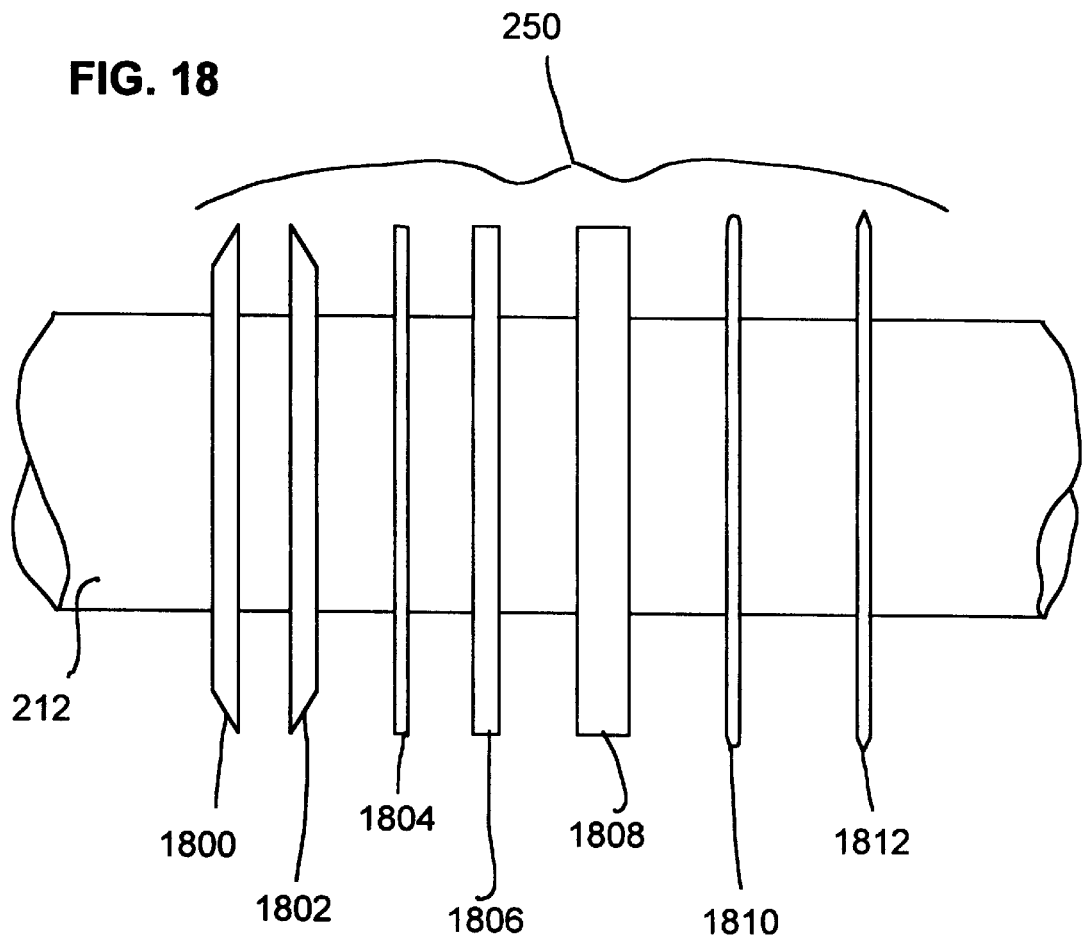
FIG. 18 illustrates a number of cutters used for producing a keyway in a duplicate key.

Different types of edge cutters 250, that may be provided on the shaft 212, are illustrated in FIG. 18. The edge cutters 250 are selected to provide the apparatus 200 with a wide capability for cutting different types of keyway profiles. The right- and left-angled cutters 1800 and 1802 permit angled channels to be cut. Channels having side slopes less steep than the cutters 1800 and 1802 may be cut using a procedure having a series of multiple passes. Use of flat cutters 1804, 1806 and 1808 results in the removal of material leaving a flat finished surface. The flat cutters 1804, 1806 and 1808 are provided in a variety of widths. The narrowest flat cutter 1804 may be used, for example, to cut a flat bottom into a narrow channel. The widest flat cutter 1808 may be used for cutting down large portions of the preform, for example in reducing the original thickness of the preform to the thickness of the original key 202 that is being duplicated. Use of the rounded cutter 1810 results in a rounded channel. Although the rounded cutter has only one radius of curvature, channels having different radii may be formed by controlling the movement of the preform 246 in all three directions x, y, and z while the channel is being cut. The "V" cutter 1812 has a "V" profile to cut a v-shaped channel. The selection of edge cutters 250 illustrated here is not intended to limit the invention. It will be appreciated that additional edge cutters, having shapes different from those illustrated here, may also be employed in forming the keyway.

Figure 6:
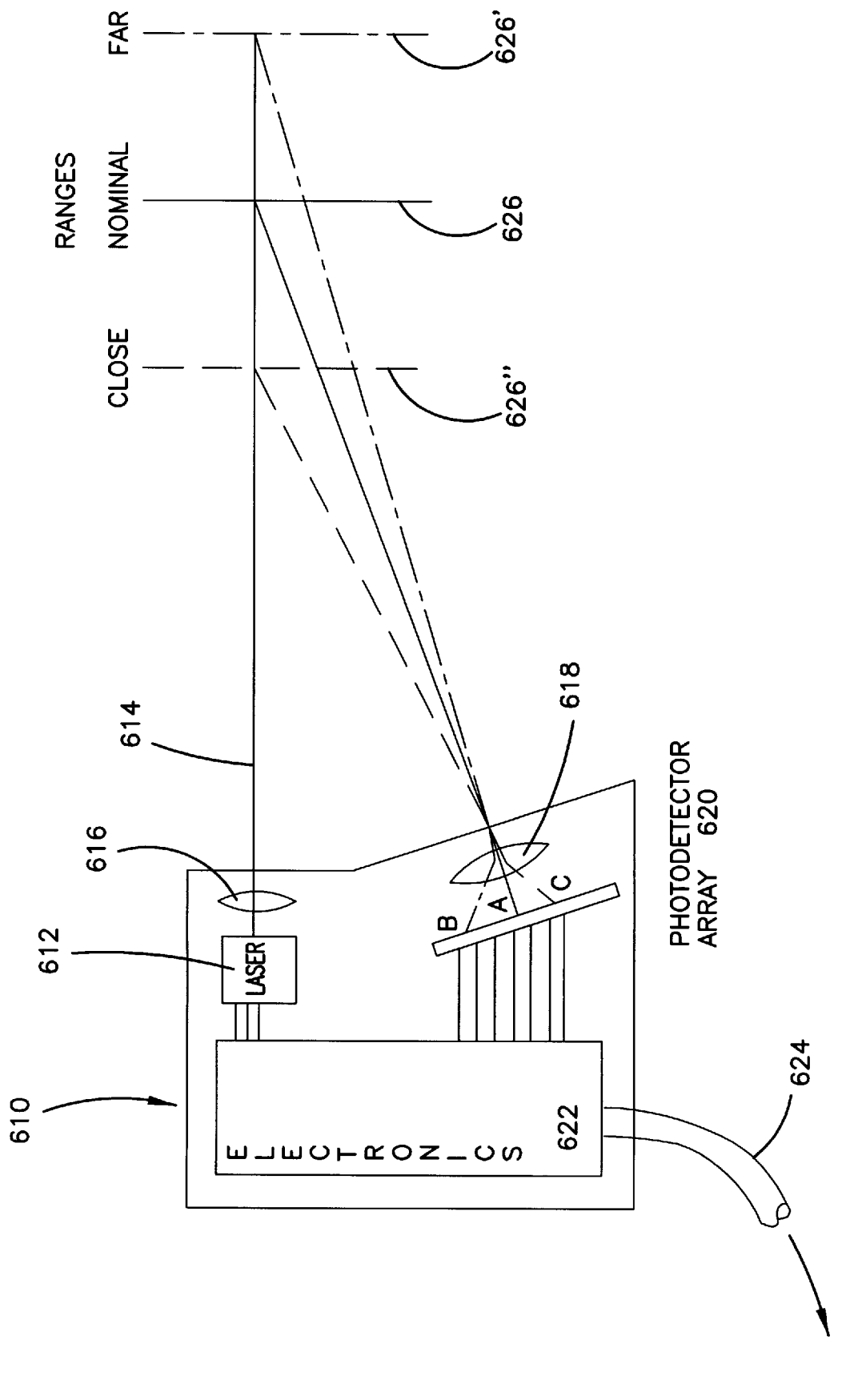
FIG. 6 illustrates an optically based measurement system for use in the key duplicating apparatus.

FIG. 6 illustrates an optically based measuring device for measuring the keycode and the keyway of the key which is to be duplicated. The measuring device 610 employs a laser 612, or other light source, to direct a light beam 614 which is collimated by collimating lens 616. The measuring device 610 includes collection optics 618 for receiving a light beam deflected by a target, and a linear photo-detector array 620 that detects the light collected by the collection optics 618. The laser 612 and the photo-detector array 620 are both coupled to an electronics package 622 which controls the output from the laser 612, and receives the detected signals from the photo-detector array 620. The electronics package 622 may also analyze the detected signals before directing data along communications link 624 to a control processor. The processor may also direct control signals into the measuring device 610 through the communications link 624. It will be appreciated that other detectors, such as a position sensitive optical detector or the like, may be used for detecting a position of the light beam.

The measuring device 610 operates as follows. The collection optics 618 and the photo-detector array 620 receive light deflected (scattered or reflected) from a target which is spaced from the measuring device 610 by a certain distance. If the target 626 is positioned at a nominal distance, then the light deflected by the target 626 and received by the collection optics 618 is consequently directed onto the photo-detector array 620 at position A. If the target 626' is positioned further from the measuring device 610 than the nominal distance, then the light (shown as a dash-dotted line) deflected the target 626' and collected by the collection optics 618 illuminates a different portion of the photo-detector array 620, shown as position B. Moreover, if the target 626' is positioned closer to the measuring device 610 than the nominal distance, then the light (shown as a dashed line) deflected by the target 626 and collected by the collection optics 618 illuminates the photo-detector array at a different position, illustrated as position C. Therefore, by detecting the position on the photo-detector array of the deflected light from the target, the distance to the target may be estimated. In one mode of operation, the position of the target 626 is varied relative to the measuring device 610 until the light collected by the collection optics 618 illuminates the photo-detector array 620 at position A.

In operation, the speed of translation of the translation stages may be adjusted, depending on how far the key 202 is measured to be away from the nominal separation from the measuring device 610. For example, if the key 202 is determined to be relatively far from the nominal separation, then the translation speed may be high. Once the target key is determined to be within a predetermined range of the nominal separation, then the translation speed may be set to be slower, and the translation speed is reduced to zero once the key is at the nominal separation.

A numerical profile of the key 202 corresponding to its physical shape can be constructed by tracking the amount of translation in three dimensions required to achieve the nominal separation between the measuring device 610 and a series of measurement points along the key 202.

Figure 7A:
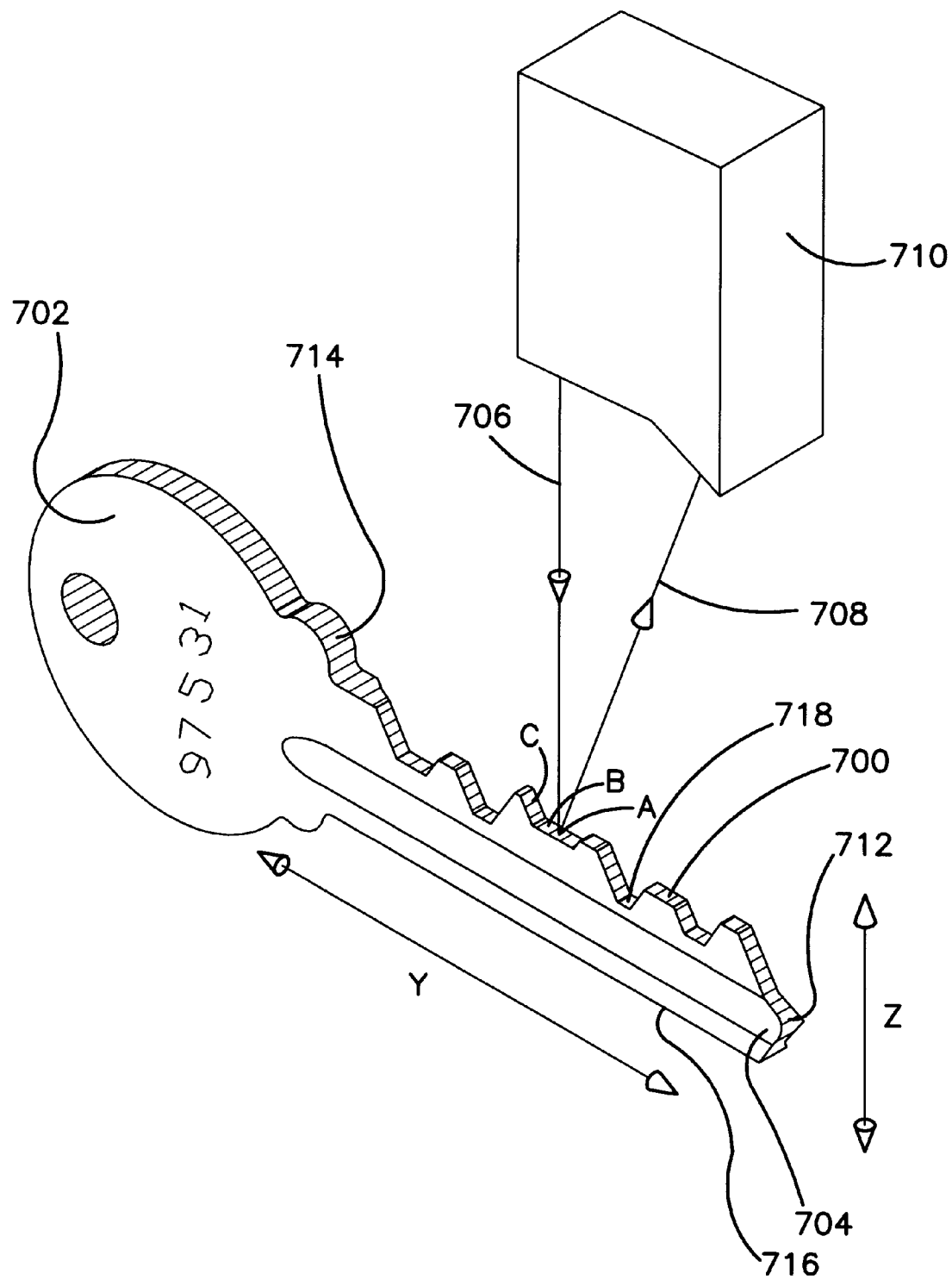
FIG. 7A illustrates an optically based measurement of a keycode.

FIG. 7A illustrates the measurement of a keycode 700 on a key 702 using a light-based measuring device 710. A light-based measuring device 702 uses an optical interaction, such as reflecting, scattering or blocking a light beam, to produce an optical signal that can be used in determining the position of a point on the key 702. It is assumed that the shank of the key 704 is aligned parallel with the y-axis. The measuring device 710 transmits a first light beam 706 to illuminate a spot on the edge of the key shank 704, designated as spot A. The light 708 deflected to the photo-detector 718 is detected by the collection optics and photo-detector array which determines whether point A is at the nominal distance, or either closer or further from the nominal distance. The detected light may be reflected or scattered by the key 702. The position of the key 702 is altered accordingly, to bring position A to the nominal distance. The position of the key 702 is recorded by tracking the movements of the translation states to achieve the nominal separation between point A and the measuring device 710. The key 702 is then translated in the y-direction so that the first light beam 706 illuminates point B, positioned close to point A but spaced by a pre-selected separation in the y-direction. The process of positioning point B at the nominal distance relative to the measuring device 710 is repeated, and the amount of translation in the y- and z-directions required to move position B to the nominal distance are noted. The key is then translated again in the y-direction so that position C is illuminated by the first light beam 706. Again, the key is adjusted in the z-direction to position point C at the nominal distance from the measuring device 710. Again, the amount of translation in y and z to place point C at the nominal distance is recorded. This procedure is repeated over the entire length of the key shank 704, from the tip 712 to the stop 714, so that the whole keycode 700 is measured.

The second edge 716 of the key shank 704 may also be measured. Where the key 702 is single-sided, as illustrated in FIG. 7A, then the measurement along the second edge 716 yields a straight line.

Where the key 702 is a double-sided key, the keycode 700 is provided on either edge of the key shank 704. Moreover, a double-sided key is typically rotationally symmetrical about an axis along the center of the key shank 704 so that the keycodes provided on the edges of the shank are identical and the keyways are the same on both sides of the key 702. The measurement on both edges of the key 716 and 718 provides independent measurements of the keycode 700. It is an important feature of the present invention that since both edges of the key shank 704 are measured, it is possible to duplicate a key where the keycodes cut on either edge are different from each other.

Figure 7B:
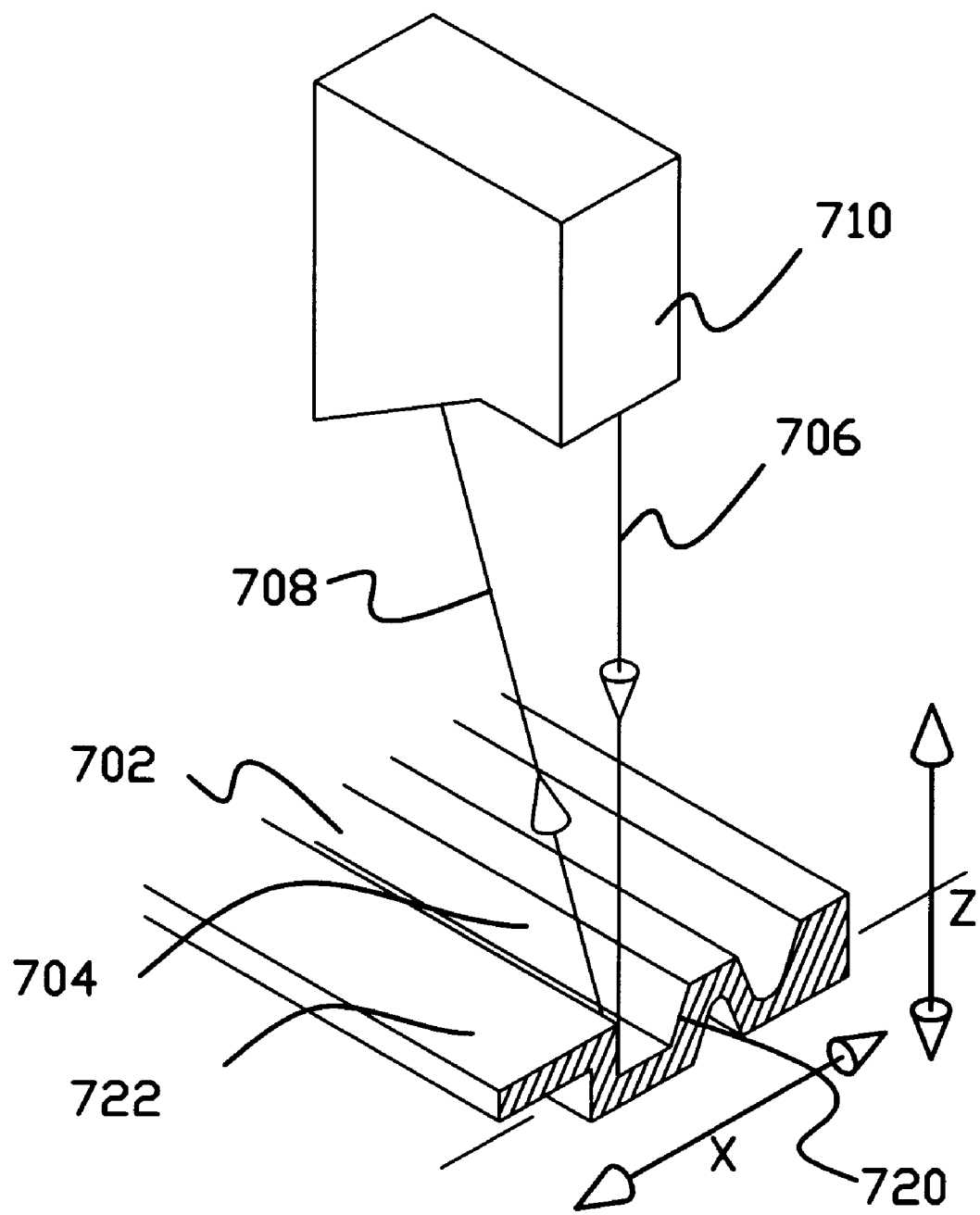
FIG. 7B illustrates an optically based measurement of a keyway.

FIG. 7B illustrates the measurement of a keyway profile on the key 702. The process of measuring the keyway profile 720 is similar to that used in measuring the keycode 700. First, the key 702 is rotated through 90° relative to the orientation used for measuring the keycode 700 so that the measuring device 710 can illuminate portions along the side 722 of the key shank 704. The keyway profile 720 is measured by positioning successive spots across the side 722 of the key shank 704 at the nominal distance from the measuring device 710. The measurement of the keyway profile 720 is advantageously made at the widest portion of the key shank 704 so that measurement of the entire keyway profile 720 is assured. The widest portion of the key shank 704 may be deduced from the measurements of the keycode 700 performed earlier.

In the descriptions of measuring the keycode and the keyway given above, it was assumed that the key shank was parallel to the y-axis, and that the side 722 of the key 702 lay parallel to the x-axis. It will be appreciated that the key 702 may not always be aligned exactly with the axis of the translation stages. However, it will also be appreciated that any deviation from such alignment may be accounted for in the software driving the translation of the translation stages. Thus, in the measurement of both the keycode and keyway, the key 702 may be translated in all three directions—x, y and z—to perform the measurement.

It will be appreciated that other optical methods may be used to measure the profile of the key 702. For example, rather than detecting light deflected by the key surface, a detector may be positioned on a side of the key 702 opposite from the light source. A point on the keycode may then be detected by moving the key across the light beam so as to cut off the light beam passing to the detector, and recording the positions of the translation stages when the beam is cut off. This may be performed for a number of points along the keycode, so as to "map" the profile of the keycode.

Figure 7C:
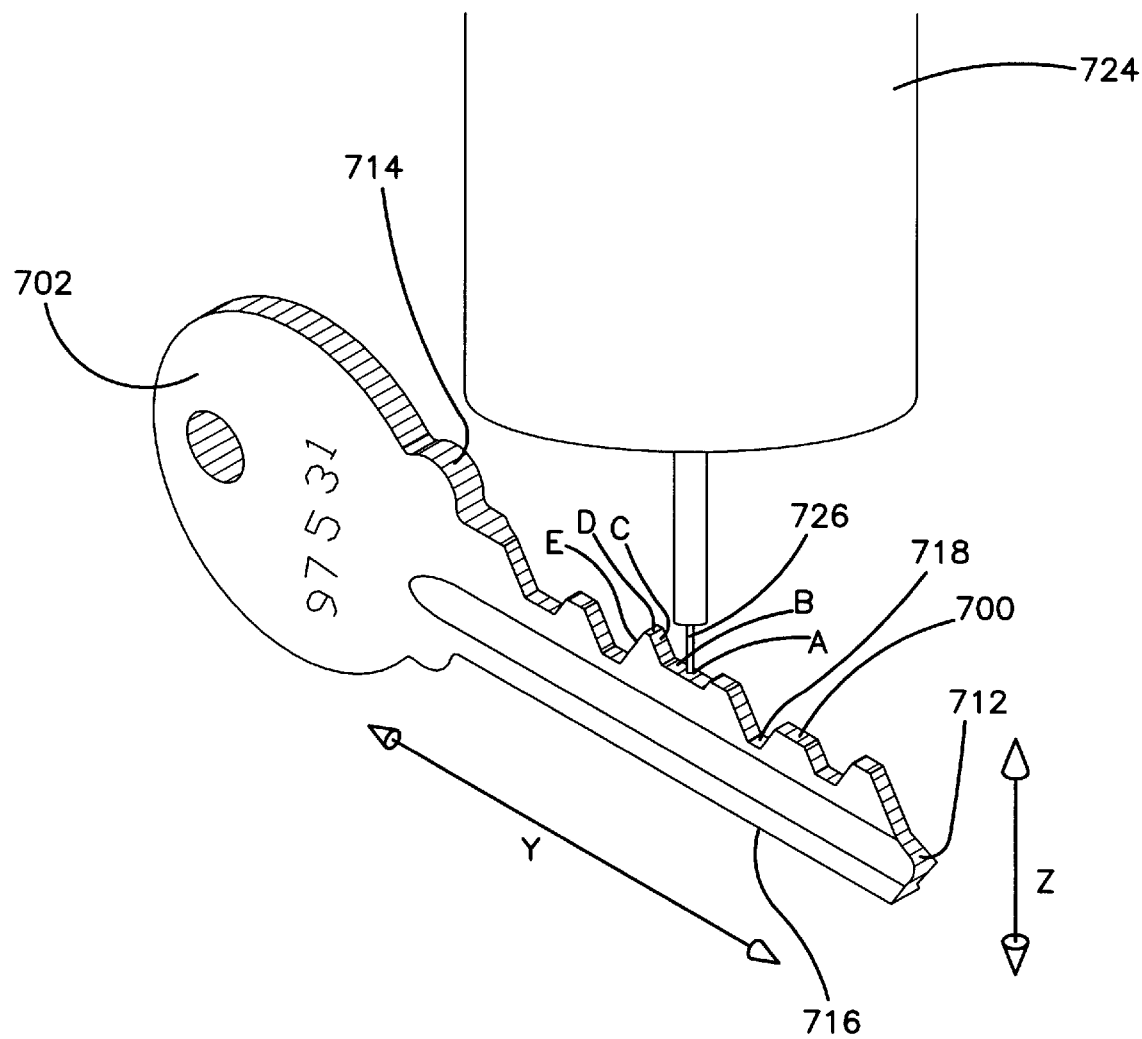
FIG. 7C illustrates a mechanically based measurement of a keycode.

It will also be appreciated that the keycode 700 and the keyway 720 of the key 702 may be measured using other methods. One such method is illustrated in FIG. 7C, where the keycode 700 is measured using a mechanical follower 724. The mechanical follower 724 has a small tip 726 that is sensitive to a force applied when brought into contact with the key edge 718. The steps for measuring the keycode 700 are similar to those discussed regarding the light-based measuring device, where a series of points along the edge 718 of the key 702 are brought into a specific position in three-dimensional space by adjusting the translation stages on which the key is mounted. The specific position in three-dimensional space is defined by the tip 726 of the mechanical follower 724.

Figure 7D:
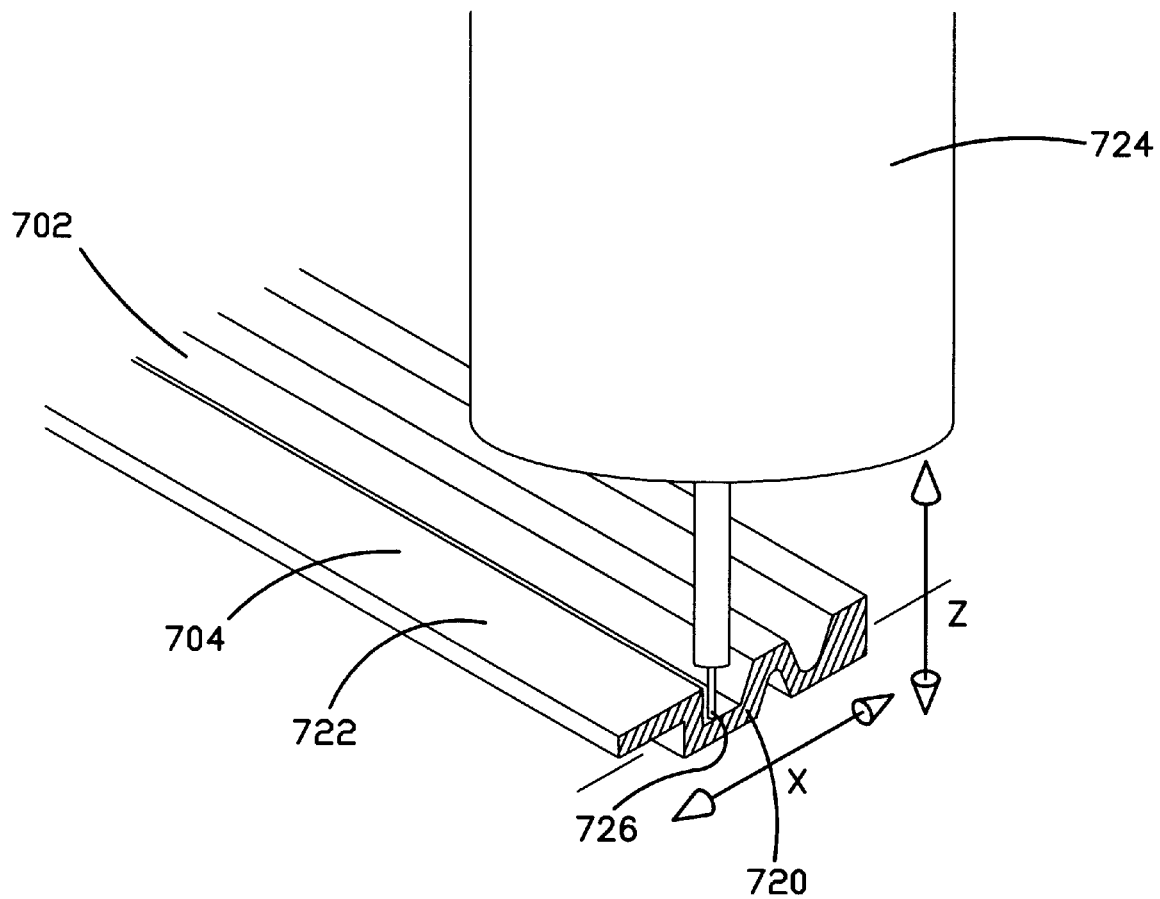
FIG. 7D illustrates a mechanically based measurement of a keyway.

FIG. 7D illustrates the mechanical follower 724 in use for measuring the keyway profile 720 of the key 702. Like the keycode measurement of the previous figure, the tip 726 of the mechanical follower 724 defines a point in three-dimensional space to which a series of positions across the shaft 704 of the key 702 are brought into contact. By measuring the displacement in x, y and z, the keyway profile 720 can be measured. As with the measurement of the keyway profile 720 using the light-based measurement system 710, both sides of the shank 704 are measured to produce a complete keyway profile.

Figure 8:
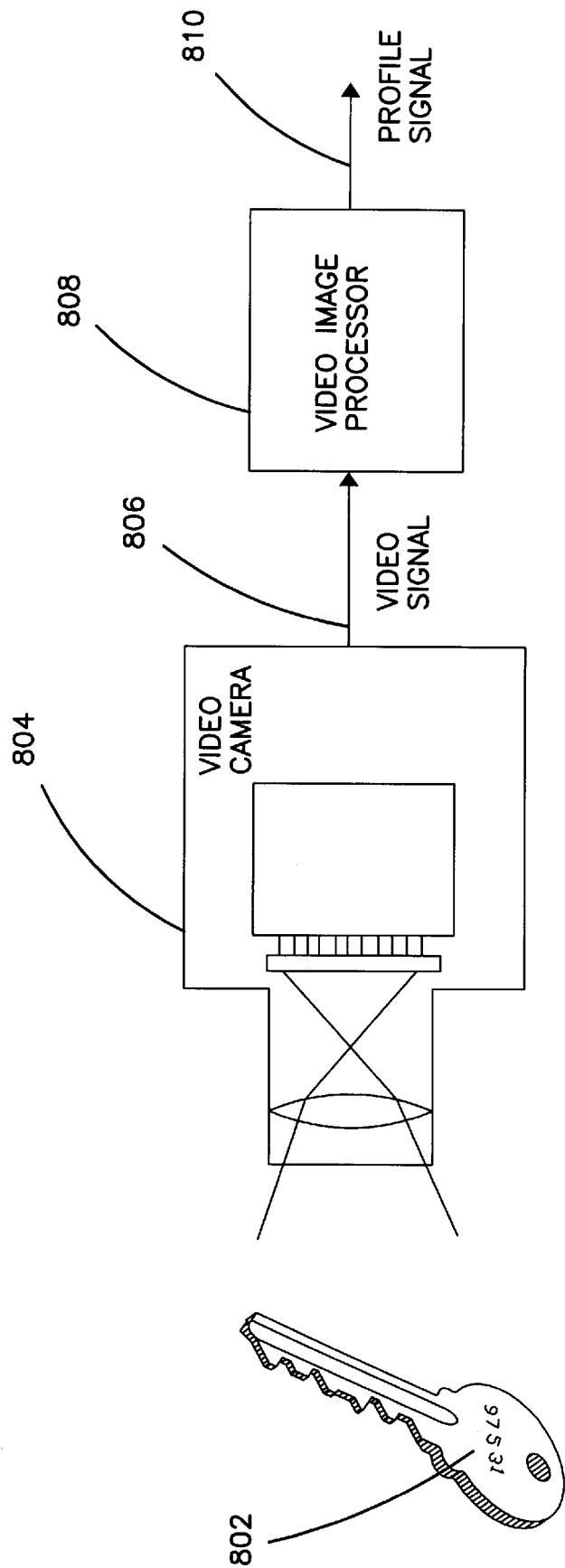
FIG. 8 illustrates the measurement of a key using a video technique.

FIG. 8 illustrates an embodiment of a measuring device that utilizes a video camera for measuring the profile of a key 802. An image of the key 802 is recorded by the video camera 804, which converts the optical image into a video signal. The video signal is transmitted on the video line 806 to the video image processor 808. The video image processor 808 converts the received video signal into key profile data using, for example, a pattern recognition technique. The key profile data contain information on the dimensions and shape of the key imaged in the camera 804. The key profile data are then converted into a series of motion control signals to control the movement of the translation stages for cutting the duplicate key.

This video approach to key measurement may provide all the required profile information using two images, one image taken from the side of the key 802 as illustrated to provide keycode information, and the other image taken of the key tip 812 in a direction along the axis of the key 802 to give keyway information. It will be appreciated that a video measurement system requires the video camera 804 and the key 802 be movable relative to each other in such a way as to permit side-on and end-on views to be taken. Thus, a video camera could be mounted on a rotating mount, for example, to allow an image to be taken of the side of the key 802 and the end of the key 802, while the key 802 remains stationary, or two fixed mount cameras 804 could be employed in orthogonal orientations.

Figure 9:
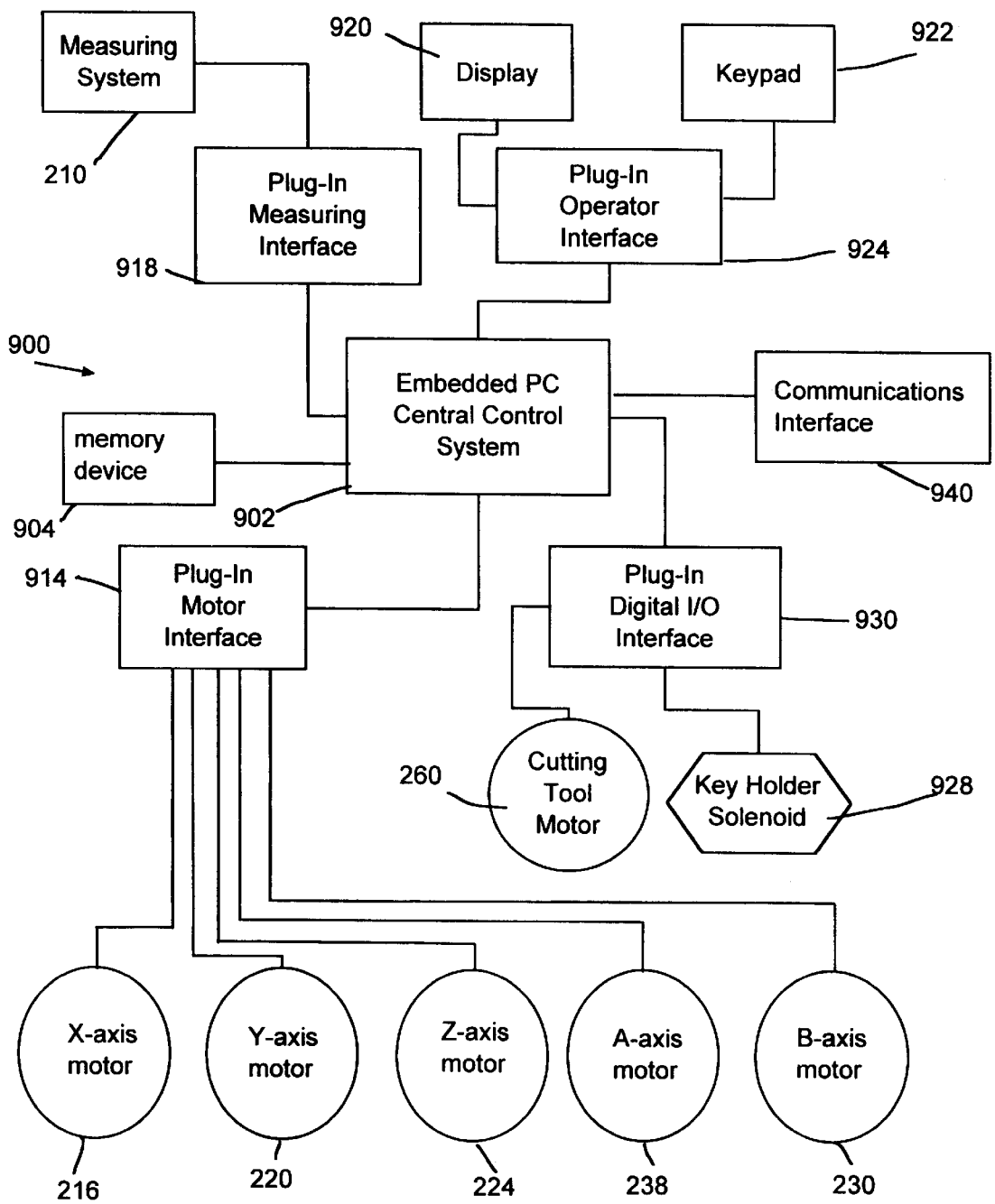
FIG. 9 is a block diagram schematic of a control system for a key duplicating apparatus.

FIG. 9 illustrates a block schematic of an embodiment of a control system for the key-duplication apparatus that may be used to control the embodiment of the duplicating apparatus illustrated in FIGS. 2–5. In this particular embodiment, the control system 900 is based on an embedded PC central control system 902 having a number of plug-in interfaces for interfacing with various subsystems of the apparatus. The control system 902 may include a memory device 904, such as a read only memory, erasable read only memory, magnetic tape or disk, CD-ROM, or the like for storing information.

The central control system 902 controls several motors 216, 220, 224, 230, and 238 via the plug-in motor interface 914. The x-axis stepper motor 216 controls the x-position of the key and the blank preform. The y-axis stepper motor 220 controls the y-position of the key and the blank preform, and the z-axis stepper motor 224 controls the z-position of the key and the blank preform. The a-axis stepper motor 238 controls the orientation of the key 202 and the blank preform 246 in the key holder 204, so that an edge or a flat surface is presented to the key-duplication apparatus 200 for measurement or cutting. The b-axis motor 230 controls the rotational position of the cutting tool 212 so that the cutting tool 212 can cut either parallel or perpendicular to the axis of the key shank or the axis of the blank preform 246.

The measuring system 210 is coupled to the central control system 902 via the plug-in measuring interface 918. The measuring system 210 transmits measurement data to the central control system 902 during measurement operations. For example, while measuring the keycode of a key, the measuring system 210 transmits information to the central control system 902 related to the relative position of the point on the key being measured to the nominal position. The central control system directs the x-, y- and z-axis motors 216, 220 and 224 accordingly to move the measurement point on the key into the nominal position. The motor interface 914 may also relay step completed information to the control system 902 so that the control system 902 maintains tracking of the position of the stepper motors 216, 220, 224, 230 and 238.

A user may interact with the apparatus via a display 920 and a keypad 922, which are interfaced with the central control system 902 via the plug-in operator interface 924. The display 920 is used for displaying information to the user concerning, for example whether or not the submitted key can be duplicated. In turn, the user may enter data, information or commands to the central control system 902 via the keypad 922. Such information or commands may include how many duplicate keys are to be produced from the submitted original key.

Other subsystems controlled by the central control system 902 include the cutting tool motor 260 and the key holder solenoid 928, which are controlled via the digital I/O interface 930. The central control system 902 controls the speed and direction of the cutting tool motor 260 according to the type of operation. For example, the cutting motor may operate at slower speeds for cutting the keyway profile than for the cutting the keycode, since there is typically more material to be removed when cutting the keyway than when cutting the keycode. Also, when deburring with the wire brush, the cutting tool motor 926 may be operated at a higher speed than during a cutting operation, and in both directions. The key holder may be operated by a solenoid 928 so as to automatically grip and release the key and blank preform from the holder.

A communications interface 940 is connected to the control system 902 which provides for communication with external sources. For example, the communications interface 940 may include a telephone modem that permits the control system 902 to receive information on the shape and dimensions of standard keycode elements from key manufacturers, or to receive a listing of known key types (combinations of keyway and keycode) that have been reported to be stolen.

Figure 10:
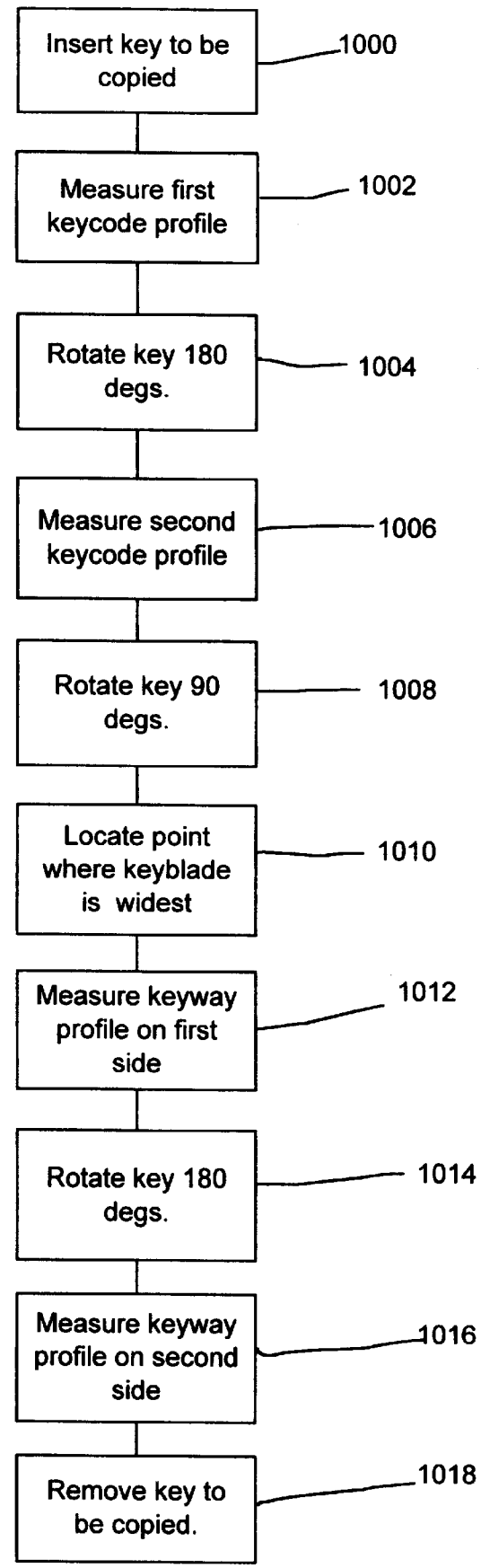
FIG. 10 lists process steps for measuring an original key.

A list of process steps for measuring a key are provided in FIG. 10. Initially, the key 202 that is to be copied is inserted in the key holder 204, at step 1000. The first keycode 242 is measured along the first edge of the key 202, at step 1002. The key 202 is then rotated through 180° in the key holder 204 to expose the second edge of the key 202 to the measuring system 210, at step 1004. The keycode profile of the second edge of the key 202 is then measured, at step 1006. Measurement of both edges of the key 202 provides information for the subsequent cutting process. An advantage of measuring the opposite edges, or the opposite sides, of the key 202 is that the controller 900 may determine if the key 202 is held in the key holder 204 with the longitudinal axis of the key parallel to a translation axis of the apparatus 200, or whether there is an angle between the key axis and the translation axis. The determination of such an angle permits the controller 900 to include the angle in subsequent analysis of the measurement data and development of cutting instructions. However, the operator may also indicate to the controller 902 that the key is single-sided, for example via the operator interface 904, thus ordering the apparatus to measure only the first edge of the key 202.

After measuring the keycodes, the key 202 is then rotated through 90° in the key holder 204, at step 1008, thus exposing the first side of the key to the measuring system 210 so that the keyway on the first side may be measured. Next, the controller 902 determines from the measurements of the keycodes where the widest point of the keyblade is located, and the measurement system 210 is positioned at the widest point, at step 1010. This ensures that subsequent measurements of the keyways on either side of the key 202 include the complete keyway. Next, the keyway profile of the first side of the key 202 is measured, at step 1012. The key 202 is then rotated through 180° to expose the second side of the key 202 to the measuring system 210 at step 1014. Next, the keyway profile on the second side of the key 202 is measured, at step 1016. The key 202 may then be removed from the key holder 204, at step 1018.

Figure 11:
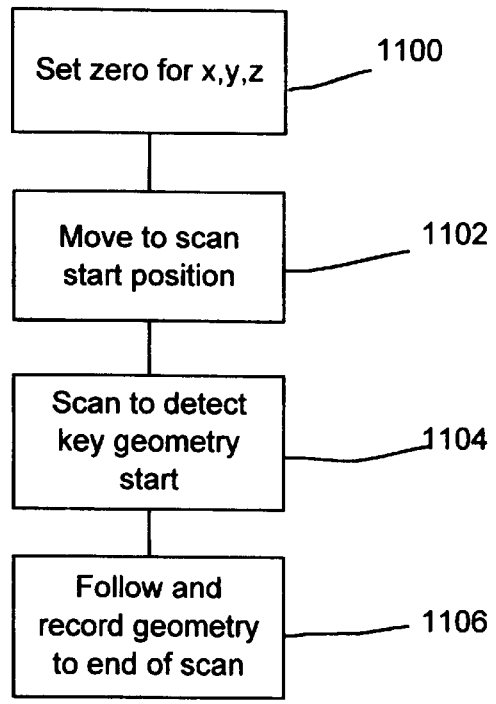
FIG. 11 lists process steps for measuring a keyway or a keycode.
Figure 12:
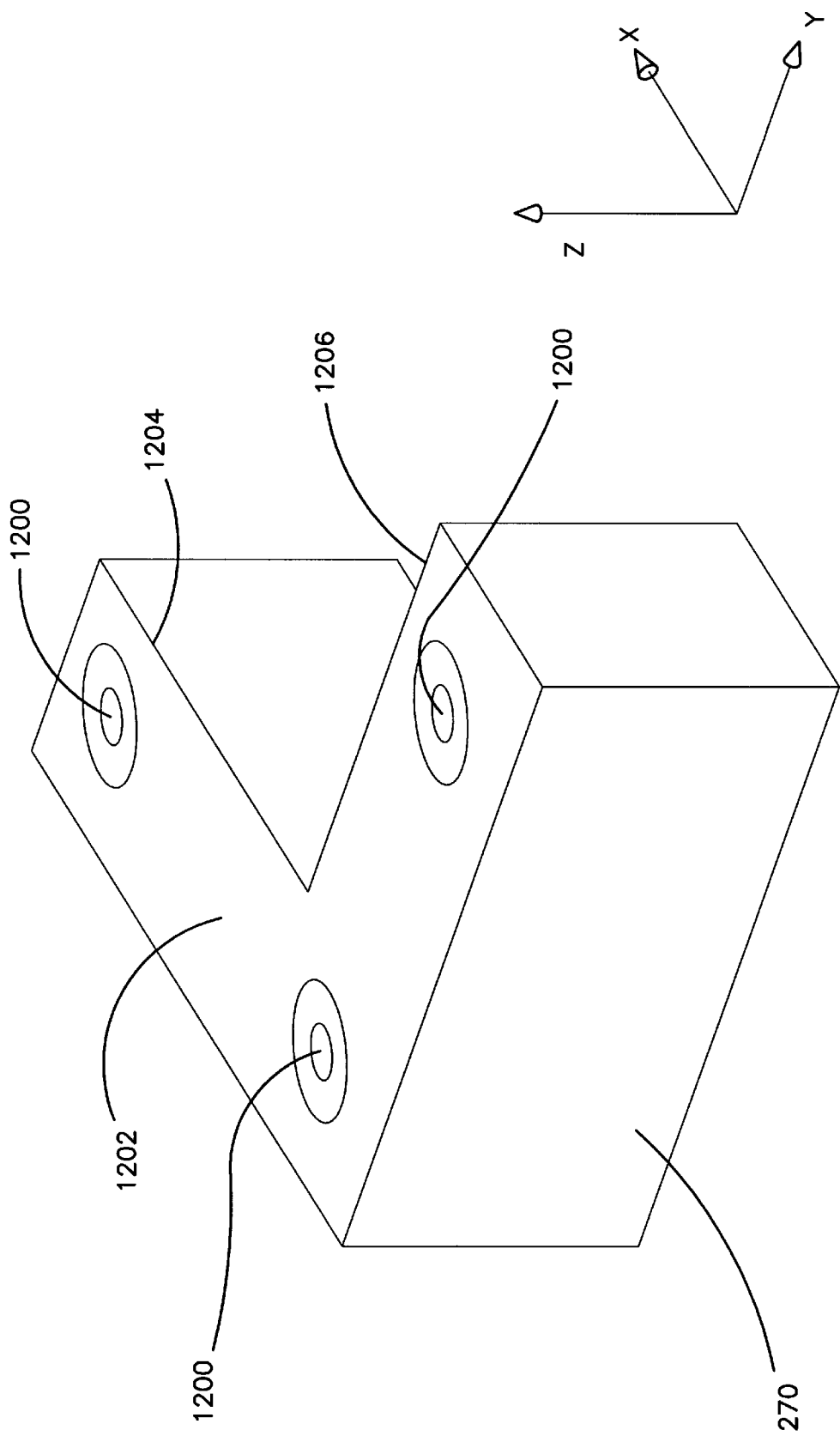
FIG. 12 illustrates a system calibration standard block.

A sequence of steps for making a measurement of a keycode or keyway is provided in FIG. 11. At the start of the sequence, the apparatus 200 is calibrated by setting the positions of the translation stages 214, 218, and 222 at a fiduciary zero for all three axes, x, y, z, at step 1100. The zeroes are set for each axis by setting the measurement 210 to locate the x-axis, y-axis, and z-axis zero steps on the system calibration standard block 270, illustrated in FIG. 2. This block is shown in greater detail in FIG. 12. The block 270 includes a number of bolt holes 1200 to receive bolts so that the block 270 can be firmly attached to the x-translation stage 214. The upper surface 1202 of the block 270 acts as the z-axis zero reference. The block also has two edges 1204 and 1206 which act as x- and y-axis reference zeroes, respectively. The initial zeroing of the apparatus 200 is performed by locating the zero surfaces and edges of the block 270 using the measuring unit 210.

The x- and y-axes are zeroed when the measuring unit detects their respective zero-edges 1204 and 1206. The z-axis is zeroed on the top surface 1202 of the block 270.

The machining axes, x, y, and z, are provided with end-of-travel motion limit switches. The calibration block is located just inside the limits of the x, y, and z travel and is initially found by first slewing each axis to its respective zero end limit switch, then stepping off the switch until the measuring unit 210 detects the appropriate reference edge or surface of the block 270. Thus, the zeroes for each axis are located close to the end of the travel on each axis.

The two rotary axes are stepped in one direction until their zero limit switch is encountered, and then stepped away to the point of signal loss.

After the zeroes have been set, the x, y, and z translation stages 214, 218, and 222 are slewed to locate the beginning point for the first scan, at step 1102. The scan start position is located outside of the maximum expected envelope of space for the key geometry to be measured, and may be simply a point in space relative to the zeroed point.

The scanning translation stages are slewed to detect where the key geometry starts, at step 1104. One or more of the translation stages 214, 218, and 222 is slewed until the measuring unit 210 detects the presence of a key surface. Then the z-axis is advanced or retracted to null the scan standoff distance, i.e., to set the nominal separation between the key surface and the measuring unit 210. The distances from the previously set zeroes traveled by the translation stages 214, 218, and 222 are recorded.

Next, the geometry of the key is followed and recorded up to the end of that particular scan, in step 1106, using the step and repeat process described above with regard to FIGS. 7 and 8. From the geometry-start position obtained in step 1104, the scanning axis is stepped to scan to the next position to be measured. Holding the scan at the reference position, the z-axis is stepped up or down to achieve the nominal separation from the measuring unit. The axis positions are recorded. A new reference position is found and the translations of each translation stage 214, 218, and 222 are recorded. The axis positions thus recorded represent a digitized form of the key shape that has been scanned, offset by the z-axis stand-off distance.

Figure 13:
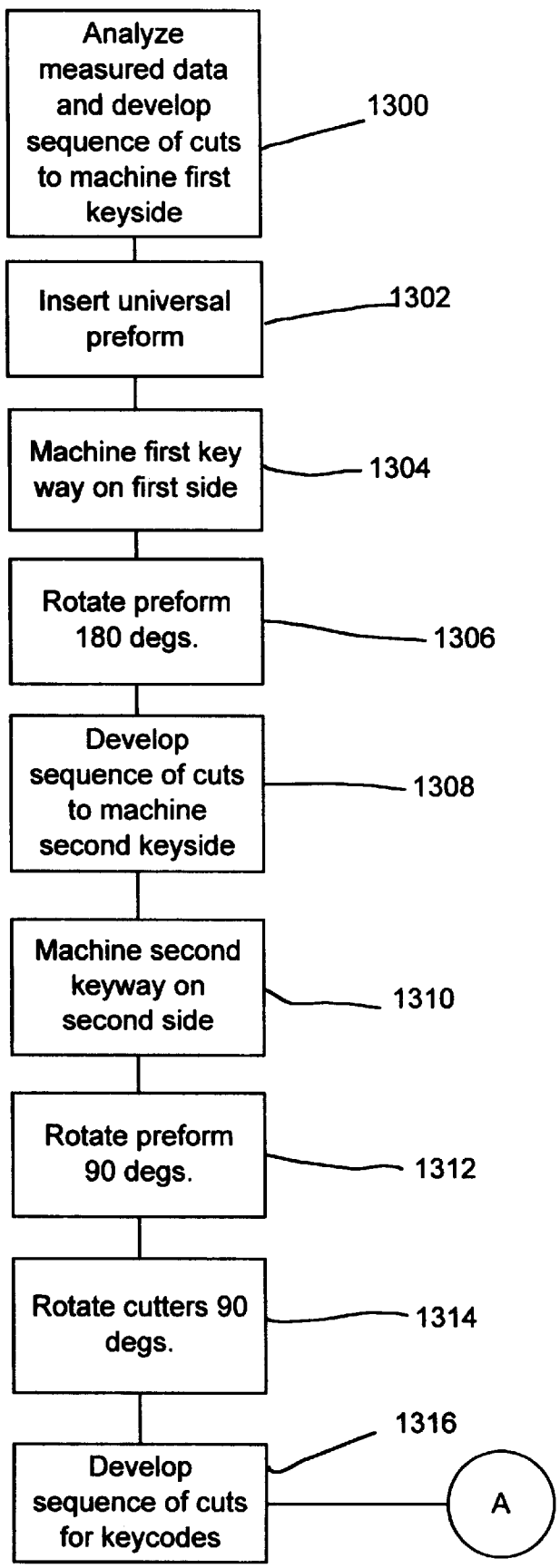
FIGS. 13 and 14 list process steps for forming a duplicate key.
Figure 14:
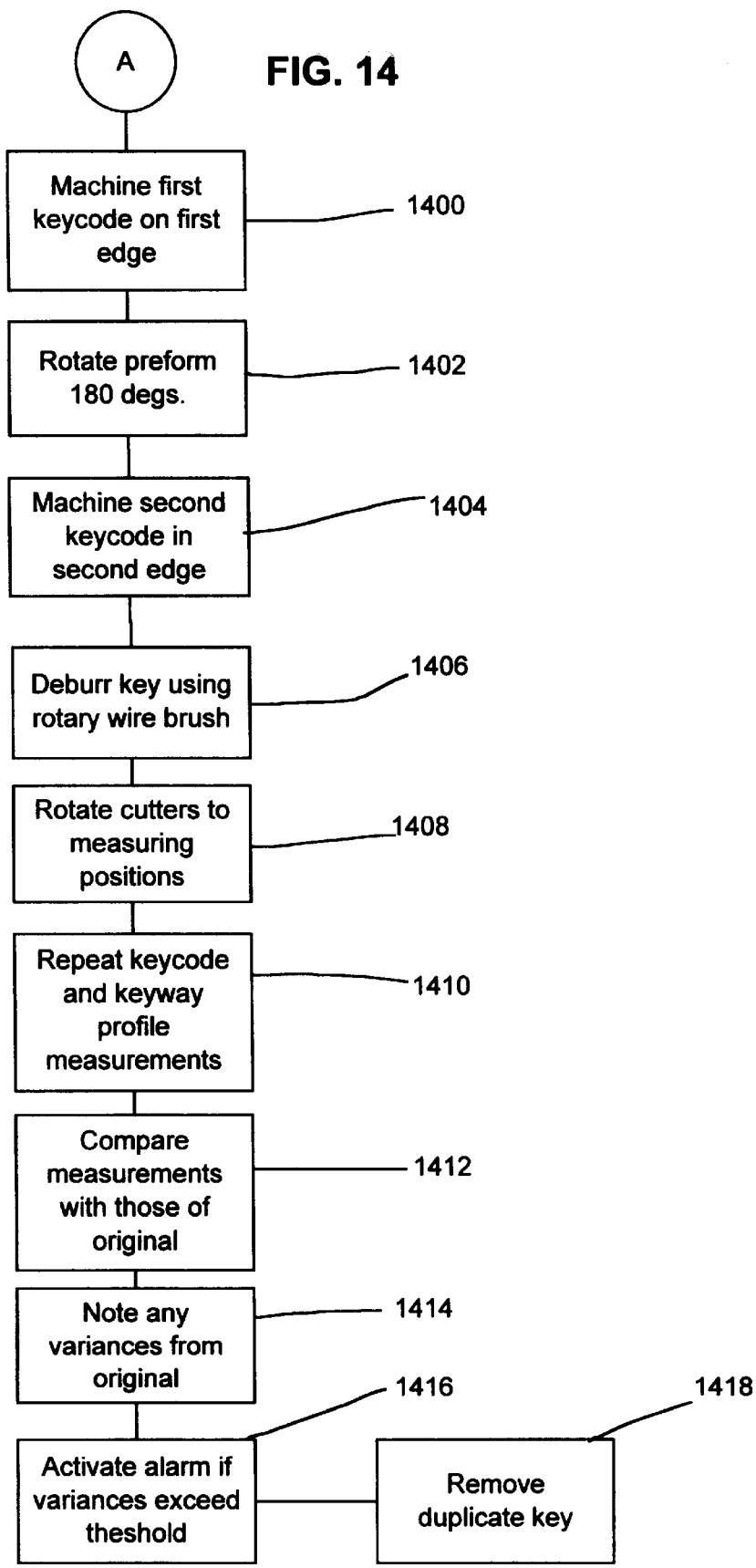

A sequence of steps for machining a duplicate key using the measurements of the original key are listed in FIGS. 13 and 14. First, the data measured from the original key are analyzed and a sequence of cuts for forming the duplicate key is developed in step 1300, for machining the first side of the preform 246. The preform is inserted into the holder 204 and held at its far end by the tip holder 248, in step 1302. The keyway on the first side of the preform 246 is machined using the edge cutters 250, in step 1304. The preform 246 is then rotated through 180°, in step 1306. If not already done, the sequence of cuts for forming the second keyway on the second side of the preform 246 is developed, in step 1308. The second keyway on the second side of the preform 246 is then machined using the edge cutters 250, in step 1310. The preform 246 is then rotated through 90°, in step 1312, to expose a first edge to the keycode cutter 252. Also, the platform 226 is rotated through 90°, in step 1314 so that the shaft 212 lies parallel to the preform 246, and the keycode cutting tool 252 is correctly oriented relative to the preform 246.

If not already done, numerical instructions for cutting the keycodes on the preform 246 are developed in step 1316. The first keycode is machined on the first edge of the preform 246, at step 1400. The preform 246 is then rotated about its axis by 180° to expose the second edge to the keycode cutter 252, in step 1402. The second keycode is then machined on the second edge of the preform at step 1404. The second keycode pass may be only for cutting the backside edge of a single sided duplicate. In forming the keycodes, the machined preform 246 may be separated from its tip held in the tip holder 248.

After all the cutting operations are over, the machined preform represents a duplicate of the original key. The duplicate key is deburred, in step 1406, using the wire brush 254 to remove any burrs or cuttings, and to soften any sharp edges which may be dangerous to a user.

Next, the platform 226 is rotated back into position, which permits measurements to be made of the duplicate key, in step 1408. The keycodes and keyways of the duplicate key are measured, in step 1410, and compared with those of the original key 202, in step 1412. Any variances between the two measurements are noted, in step 1414, and a flag is set, in step 1416, if the variances in measurement between the original key 202 and the duplicate key exceed a predetermined threshold, for example a few thousandths of an inch. Any variances thus measured may be indicative of wear on the key-duplicating apparatus 200: this is discussed further hereinbelow. The duplicate key is then removed from the apparatus, at step 1418.

Figure 15:
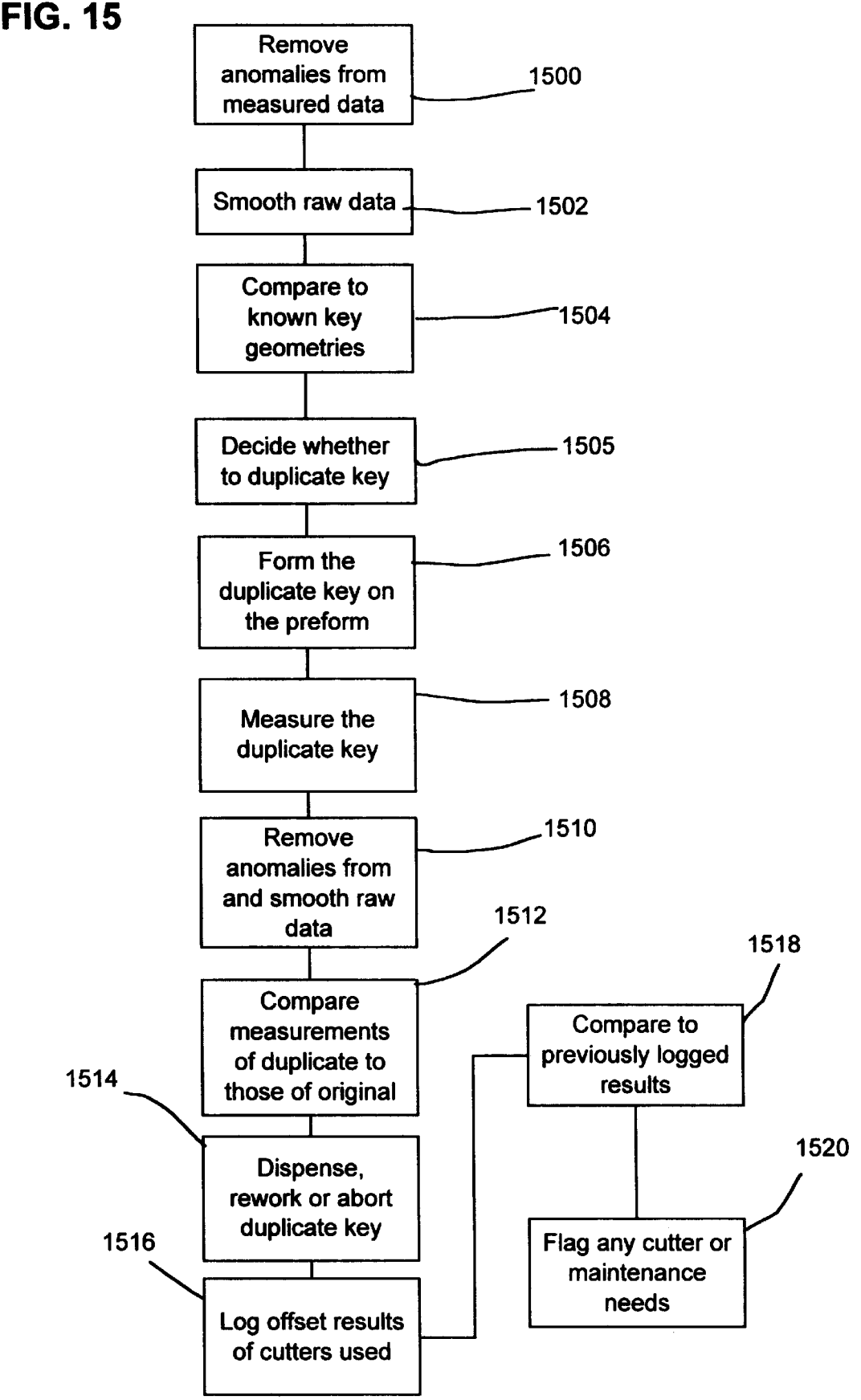
FIG. 15 lists process steps for analyzing measured key profile data.

A sequence of steps for analyzing measured key profile data are provided in FIG. 15. First, any anomalies or glitches present in the data measured from the original key are removed, in step 1500. This is done using generalized key-shape knowledge to remove any possible abnormal details that the measuring unit 210 might generate in error. Next, the raw data are smoothed, in step 1502, using a smoothing algorithm to mathematically smooth the scanned data.

Next, the measured key shape is compared to known key geometries, in step 1504. Here, the measured key shape is compared to stored, known key-shape data, for example, as supplied by key manufacturers, to determine if a match might exist. Key-shape data may be downloaded to the apparatus 200 via a telephone or other communications link through the communications interface 940, or may be stored locally in the memory device 904. These data may include key shapes of high security keys whose duplication is forbidden, or combinations of keyway profiles and keycodes for keys that have been reported to be lost or stolen. In step 1505, a decision is then made, based on the results of the comparison in step 1504, on whether or not to duplicate the measured key. For example, if the measured key is shown to be close to a standard key shape provided by a key manufacturer, the shape of the standard key may be used for the instructions for cutting the duplicate, rather than the measured data, since the measured key may be worn and may no longer retain the same shape and size as when new. Also, if the measured key is determined to be lost or stolen, a signal may be directed through the communications interface 940 to another location, such as a manufacturer's information desk or the police.

The duplicate key is then formed on the preform 246, in step 1508, using the measured, de-glitched, and smoothed data to machine the duplicate. The duplicate key is then measured in step 1508 and the anomalies removed and the raw data smoothed, in step 1510.

The measurements of the duplicate key are compared with those of the original key 202, in step 1512. A decision on whether to accept the duplicate key, rework the duplicate key or abort the duplicate key is made in step 1514. This decision is made on the results of the comparison in step 1512. If the measurements of the duplicate key are acceptably accurate in comparison with the measurements of the original key 202, then the duplicate key is deemed to be acceptable. A flag may be set to indicate if the duplicate key is to be aborted. A new preform may then be loaded into the holder 204 and tip holder 248 and a new duplicate key cut. The offset between the measurement results for the original key 202 and the duplicate key are logged, in step 1516, along with a listing of which edge cutters 250 were used in cutting the keyways on the preform 246. It will be appreciated that the edge cutters 250, the keycode cutting tool 252, and the motion system, including the translation stages 214, 218, and 222, may wear with use. Such wear can be compensated for in gradual increments by keeping a record of the machine and specific cutting performance after each use.

The logged results are compared to previously logged results in step 1518. By comparing the results after each usage to previous results, sudden changes in system performance can be discovered. By comparing the present results to older or average data, the controller can make decisions on how to gradually compensate for machine or cutter wear.

Any cutter or machine maintenance needs are flagged, in step 1520, for example, by sending a message to the display 920 or through the communication interface 940 to a maintenance desk. When the gradual compensation discussed with regard to step 1518 reaches certain preset limits, the particular cutter or machine element showing excessive offset or error is flagged for future repair or replacement. This maintenance status log may be available for uploading to a central monitoring station, or displayed on the display 920.

Figure 16:
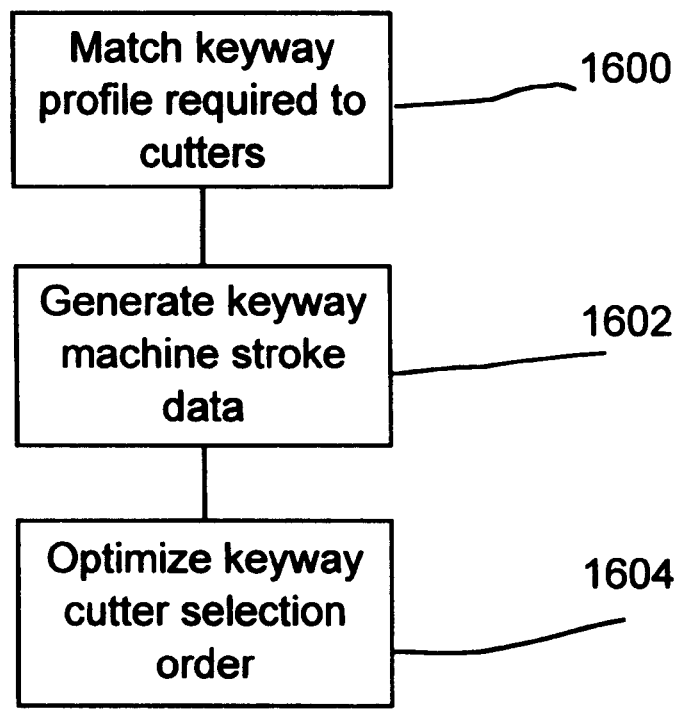
FIG. 16 lists process steps for producing cutting instructions for a keyway.

A sequence of steps for producing cutting instructions for a keyway is illustrated in FIG. 16. First, a match is made between the measured keyway profile and the cutters required to cut the profile, in step 1600. Using the de-glitched and smoothed keyway profile data from the original key, the shape geometry of the keyway profile is matched to one or more edge cutters 250. In performing this matching, the processor selects for each keyway channel the keyway cutter that will remove the most material and will most closely approach the profile without overcutting, for the first pass. Each channel of the keyway on each side of the key may require multiple machining passes using more than one edge cutter 250 to produce the profile line within the acceptable profile tolerance.

Next, the machine stroke is generated for producing the keyway. Using the edge cutters 250 selected in step 1600 for each keyway channel, the stroke or pass pattern is computed that approximates the keyway profile shape within the acceptable profile tolerance. Each keyway channel is computed for each side of the key individually. By approximating the desired keyway profile within the acceptable keyway profile tolerance with the fewest number of machining strokes or passes, then the machining time for performing the keyways may be minimized.

The keyway cutter selection order is then optimized, in step 1604. One method of optimizing the selection order is to order of cutter passes per channel so that minimizes cutter selection motion, i.e. the transverse motion of the preform 246 to move from one edge cutter 250 to another is reduced, while permitting maximum material removal per pass. This method may be used to minimize the time to complete a given keyway side. The keyway on the first side of the preform 246 is completed prior to rotating the key for machining the keyway on the opposite side.

Figure 17:
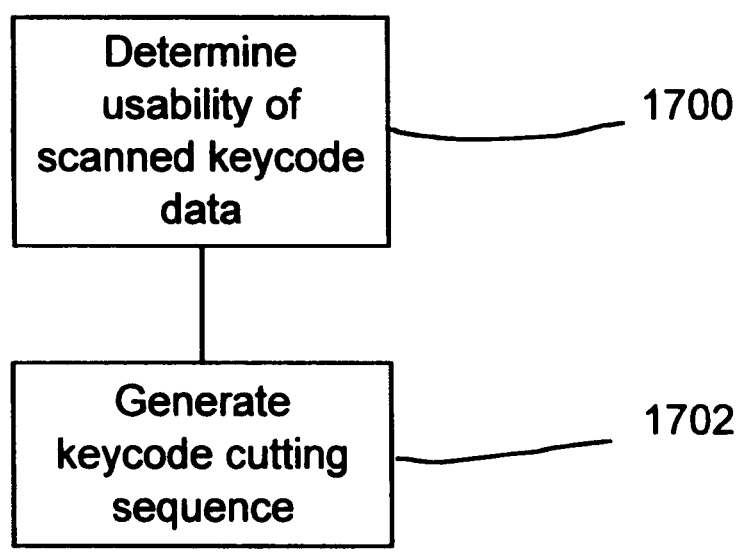
FIG. 17 lists process steps for producing cutting instructions for a keycode.

A sequence of steps for determining a cutting sequence for keycodes is illustrated in FIG. 17. First, the usability of the scanned keycode data is determined, in step 1700. Using the de-glitched and smoothed keycode data measured from the original key, and using known keycode step increments for keys of the measured style and geometry, information supplied by the original manufacturer, the usability of the measured data without compensation is determined. Keycode data that is either too heavy or too thin may be the result of measuring from a worn key or an oversized duplicate of the manufactured key. The controller 900 may request from the user, for example, through the display 920, whether compensation should be applied and also whether the key may be oversized or worn. The duplicate key can then be made according to standard keycode increments for the style and geometry of the original key 202. If the keycode data are not generally offset, but instead are incrementally offset, then the controller may decide that no compensation for wear or oversized conditions should be included.

Next, the keycode cutting sequence is generated, in step 1702. Keycodes are machined in a single direction pass per edge, starting at the key bow and progressing to the key tip. The keycode cutter 252 is positioned perpendicular to the keyway access on the key bow side, flat on the perimeter, and 45° beveled on the key tip side. The keycode cutter is oriented with the rotating access parallel to the keyway access. A continuous machining pass is started with a plunge cut at the key bow end, followed by side cutting with angled transitions either in or out to reach and machine each keycode step of the key. Double-sided keys are machined on each edge sequentially. Keycode passes may be repeated at incremental depths, and/or partial passes until the final geometry is reached.

While various examples were provided above, the present invention is not limited to the specifics of the examples. For example, the duplication apparatus may be provided with two holders, one for holding the key to be copied and the other for holding the preform. Also, the apparatus may be inverted or rotated to allow cutting scraps to fall free of the machine elements.

Additionally, it is possible to supply semi-prepared preforms to the duplicating apparatus, where the keycode has already been cut or partly formed. The duplicating apparatus may simply measure the keyway of the original key and duplicate the keyway in the preform, and may also duplicate the remainder of the keycode if necessary.

As noted above, the present invention is applicable to duplicating keys from original keys from a blank preform. It is believed to be particularly useful in producing duplicate keys where it is desirable to reduce the expected degree of skill of the operator and to reduce the number of rejected duplicates. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of duplicating a first key in a key preform, comprising:

measuring a first keycode of the first key to produce a first keycode measurement;

measuring a first keyway of the first key to produce a first keyway measurement;

forming a second keyway in the key preform with a keyway forming tool selected using the first keyway measurement; and forming a second keycode in the key preform with a keycode forming tool different from the keyway forming tool using the first keycode measurement to produce a duplicate of the first key in the key preform.

2. The method of claim 1, further comprising measuring the second keycode and the second keyway, comparing the first and second keycodes and the first and second keyways to determine a difference between the first key and the duplicate of the first key.

3. The method of claim 2, further comprising determining an operational status of a key duplication system from the difference determined between the first key and the duplicate of the first key.

4. The method of claim 3, further comprising determining among accepting, rejecting or reworking the duplicate of the first key in response to the difference determined between the first key and the duplicate of the first key.

5. The method of claim 1, further comprising producing measurement data from measuring the first keycode and the first keyway, and generating instructions for forming the second keyway and the second keycode using the measurement data.

6. The method of claim 5, comprising the further steps of comparing the measurement data with predetermined standard keycode data and adjusting the instructions to compensate for differences between the measurement data and the predetermined standard keycode data.

7. The method of claim 1, further comprising measuring length, width and thickness of a key shank of the first key.

8. The method of claim 1, further comprising forming the second keyway in a first side of the key preform, rotating the key preform, and forming the second keyway in a second side of the key preform.

9. The method of claim 1, wherein measuring the first keycode and the first keyway comprises measuring the first keycode and the first keyway with a mechanical device contacting the first key.

10. The method of claim 1, wherein measuring the first keycode and the first keyway comprises producing a video image of the first key and determining dimensions of the first keycode and first keyway using the video image.

11. The method of claim 1, wherein measuring the first keycode and the first keyway comprises illuminating the first key with a light source, moving the light source relative to the first key while detecting light deflected from the first key, and storing light deflection data as a function of position of the light source relative to the first key.

12. The method of claim 1, further comprising producing measurement data from measuring the first keycode and the first keyway, comparing the measurement data with data in a missing key database so as to identify missing keys.

13. A system for duplicating a first key in a key preform, comprising:
    a key holder to hold the first key and the key preform;
    a measuring device to measure a first keycode and a first keyway of the first key;
    a controller to store key measurement data received from the measuring device and to generate shaping instructions using the measurement data; and
    a shaping device to shape a second keycode and a second keyway in the key preform according to the shaping instructions.

14. The system of claim 13, wherein the measuring device comprises a light source to produce light illuminating the first key, a mechanism to controllably produce relative movement between the light source and the first key, and a detector to detect at least one of light reflected by the first key and light transmitted past the first key.

15. The system of claim 13, wherein the measuring device comprises a mechanical follower connected to a force transducer to detect force exerted on the mechanical follower, and a moving mechanism to controllably produce relative movement between the mechanical follower and the first key.

16. The system of claim 13, wherein the measuring device comprises a video imaging device to produce an electronic image of the first key, and a processor unit to determine a measurement of at least one of the first keycode and the first keyway using the electronic image.

17. The system of claim 13, wherein the shaping device comprises a keyway profiler rotatable around a profiler axis, the profiler axis being substantially perpendicular to a keyshaft axis of the key preform, the keyway profiler having a plurality of cutter sets, each cutter set being associated with a standard keyway.

18. The system of claim 13, wherein the first key holder is rotatable around a first key axis.

19. The system of claim 13, wherein the controller communicates with a database of standard keycode dimensions, and the controller compares the measurement data with the database of standard keycode dimensions to generate correction values for the measurement data.

20. Apparatus for measuring a key using light, comprising:
    a light source to produce light to illuminate the key;
    a detector to detect one of light reflected by the key and light transmitted past the key to generate light detection data;
    a mechanism to move one of the light source and the key, so as to produce relative motion between the light source and the key;
    a rotating mechanism to rotate a key holder around an axis essentially parallel to a key shank axis so as to permit measurement of opposing surfaces of the key; and
    a controller to control the moving mechanism in response to the light detection data.

21. The apparatus of claim 20, wherein the moving mechanism comprises a stepper motor responsive to control information from the controller.

22. The apparatus of claim 20, wherein the detector comprises a detector array to detect light reflected by the key, the light source and detector cooperating to produce a detected signal varying as a function of position along the detector array in accordance with a distance between a reflecting surface of the key and the light source.

23. A method of measuring a key with light, comprising:
    illuminating the key with light from a light source;
    moving one of the key and the light source to produce relative motion between the key and the light source;
    rotating the key around an axis essentially parallel to a key shank axis using a rotating mechanism to rotate a key holder, so as to present opposing surfaces of the key to the light source; and
    detecting variations in an optical interaction between the key and the light.

24. The method of claim 23, wherein the detecting step comprises detecting a position of a signal on a detector array in response to moving one of the key and the light source.

25. A method of processing a key preform, using a first key as a reference, comprising:
    measuring a first keyway of tile first key to produce keyway data; and
    forming a second keyway in the key preform using control signals based on the keyway data.

26. A method as recited in claim 25, wherein the control signals based on the keyway data are electrical control signals.

27. A system for processing a key preform, using a first key as a reference, comprising:
    a key holder to hold the first key and the key preform;
    a measuring device to measure a first keyway in the first key and to produce keyway measurement data;
    a controller coupled to the measuring device to receive the keyway measurement data and to produce control signals in response to the keyway measurement data; and
    a shaping device coupled to the controller to receive the control signals;
    wherein the shaping device forms a second keyway in the key preform in response to the control signals.

28. An apparatus for duplicating a first key in a key preform, comprising:
    a holder to hold the first key and the key preform;
    a measuring unit to measure the first key;
    a controller, coupled to the measuring unit, to receive measurement data of the first key from the measuring unit;
    a cutting unit, coupled to the controller to receive cutting commands, including keyway edge cutters and a keycode cutter; and
    a motion unit, coupled to the controller to receive motion commands, to provide relative motion between the holder and the measuring unit, and between the holder and the cutting unit.

29. The apparatus of claim 28, wherein the measuring unit comprises a light-based measuring system that detects a separation between the measuring unit and the first key.

30. The apparatus of claim 28, wherein the edge cutters and the keycode cutter are disposed on a single shaft, and the cutting unit further includes a wire brush disposed on the shaft, the shaft being rotatable so as to be perpendicular and parallel to a longitudinal axis of the key preform.

31. The apparatus of claim 28, wherein the holder is mounted on the motion unit, and the motion unit includes three translation stages, translation in a direction of any one of the translation stages being orthogonal to translation directions for the other two translation stages, each translation stage being operated by a respective stepper motor responsive to translation commands received from the controller.

32. The apparatus of claim 31, wherein the cutter unit and the measuring unit are mounted on a platform relative to the motion unit and the platform is rotatable to select cutting or measuring function and is coupled to the controller to receive rotation commands therefrom.

33. A method of processing a key preform, using a first key as a reference, comprising:

measuring a first keyway of the first key; and forming a second keyway in the key preform using a tool selected in response to the measurement of the first keyway.

34. A system for processing a key preform, using a first key as a reference, comprising:

a measuring device to measure a first keyway in the first key and to produce keyway measurement data;

a controller coupled to the measuring device to receive the keyway measurement data and to select a cutting tool in response to the keyway measurement data; and a shaping device having at least two cutting tools selectable by the controller to cut a keyway in the preform.

35. A method of processing a key preform, using a first key as a reference, comprising:

measuring a first keyway of the first key to produce measurement signals;

converting the measurement signals produced in a first form to control signals in a second form; and forming a second keyway in the key preform using the control signals.

36. A method of processing a key preform, using a first key as a reference, comprising:

sequentially measuring a first keyway of the first key; and then forming a second keyway in the key preform using a measurement of the first keyway.

37. A method according to claim 36, wherein the second keyway is formed on a first side of the preform and then on the second side.

38. A system for processing a key preform, using a first key as a reference, comprising:

a measuring device to measure a first keyway in the first key and to produce keyway measurement data;

a controller coupled to the measuring device to receive and store the keyway measurement data and to produce control signals derived from the keyway measurement data; and a keyway shaping device coupled to the controller to receive the control signals;

wherein the keyway shaping device forms a second keyway in the key preform in response to the control signals after the measuring device has measured the first key.

39. A system as recited in claim 38, further including a holder operatively coupled to the controller and configured to hold and rotate the key preform, wherein the holder presents a first side of the preform to the keyway shaping device and rotates the key preform to present a second side to the keyway shaping device.

* * * * *